US012712593B2

(12) United States Patent
Alberti Arroyo

(10) Patent No.: US 12,712,593 B2
(45) Date of Patent: Aug. 18, 2026

(54) TRANSMISSION LINE DIAGNOSTICS

(71) Applicant: Analog Devices International Unlimited Company, Limerick (IE)

(72) Inventor: Hector Enmanuel Alberti Arroyo, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/639,663

(22) Filed: Apr. 18, 2024

(65) Prior Publication Data

US 2025/0330211 A1 Oct. 23, 2025

(51) Int. Cl.
*H04L 25/00* (2006.01)
*H04B 3/23* (2006.01)

(52) U.S. Cl.
CPC .................................... *H04B 3/23* (2013.01)

(58) Field of Classification Search
CPC ...... H04L 63/08; H04L 67/1095; H04M 9/08; H04B 3/23; G01R 23/16; G01R 31/11; G01R 31/58
USPC .......................................................... 375/257
See application file for complete search history.

(56) References Cited

U.S. PATENT DOCUMENTS 6,237,739 B1 5/2001 Mazur et al.
2003/0020898 A1 1/2003 Wyar
2004/0230385 A1 11/2004 Bechhoefer et al.
2006/0007991 A1* 1/2006 Wang ...................... H04B 3/46 370/290
2012/0297207 A1* 11/2012 Carlsen ............... G06F 13/4081 713/300
2015/0022803 A1* 1/2015 Xia .................... G01M 11/3127 356/73.1
2015/0163349 A1 6/2015 Ardestani et al.
2018/0143239 A1 5/2018 Sallem
2019/0107573 A1 4/2019 Ben Hassen et al.
2019/0293706 A1* 9/2019 Sohn ...................... G01R 31/08
2021/0075102 A1* 3/2021 Shimura .................. H04B 7/06
2024/0272218 A1* 8/2024 Kumar ................... G01R 27/06
2025/0164539 A1 5/2025 Alberti Arroyo

FOREIGN PATENT DOCUMENTS

WO 2005036189 4/2005

OTHER PUBLICATIONS

"Amendment 5: Physical layers specifications and management parameters for 10 Mb s operation and associated power delivery over a single balanced pair of conductors", International Standard ISO IEC IEEE 8802-3: Amd 5, IEEE, (Dec. 2021), 260 pgs.

(Continued)

*Primary Examiner* — Khai Tran
(74) *Attorney, Agent, or Firm* — Schwegman Lundberg & Woessner, P.A.

(57) ABSTRACT

There is provided a method of a method for characterising a cable or transmission line, the method comprising: obtaining a first echo response using time domain reflectometry; coupling a first end of the cable or transmission line to a time domain reflectometer; obtaining a second echo response using time domain reflectometry; determining a characteristic of the cable or transmission line by comparing the first echo response and the second echo response.

32 Claims, 20 Drawing Sheets

(56) References Cited

OTHER PUBLICATIONS

"U.S. Appl. No. 18/516,023, Non Final Office Action mailed Jul. 28, 2025", 19 pgs.
"U.S. Appl. No. 18/516,023, Response filed Oct. 10, 2025 to Non Final Office Action mailed Jul. 28, 2025", 11 pgs.
"European Application Serial No. 24214110.9, Extended European Search Report mailed May 8, 2025", 9 pgs.
Cozza, Andrea, "Never Trust a Cable Bearing Echoes: Understanding Ambiguities in Time-Domain Reflectometry Applied to Soft Faults in Cables", IEEE Transactions on Electromagnetic Compatibility, IEEE Service Center , New York, NY, US, vol. 61, No. 2, (Apr. 1, 2019), 586-589.
"U.S. Appl. No. 18/516,023, Non Final Office Action mailed Nov. 24, 2025", 31 pgs.
"U.S. Appl. No. 18/516,023, Response filed Feb. 20, 2026 to Non Final Office Action mailed Nov. 24, 2025", 12 pgs.
"U.S. Appl. No. 18/516,023, Final Office Action mailed Mar. 26, 2026", 33 pgs.

* cited by examiner

TRANSMISSION LINE DIAGNOSTICS

TECHNICAL FIELD

The present disclosure relates to characterisation of cables or transmission lines, and in particular to a method of characterising the properties of a cable or transmission line.

BACKGROUND

Cables or transmission lines, such as ethernet cables, are used in a wide variety of applications and locations. A number of different technical standards define communications using these cables or transmission lines and set limits or ranges on the properties or characteristics of cables or transmission lines that can be used with those technical standards.

Increasing communication speed and quality provided by some standards, such as IEEE802.3cg standard containing the 10BASE-T1L definition, introduce an increased need to guarantee a high-quality transmission line. Cables or transmission lines may be characterised during manufacture using a vector network analyser. For example, the impedance, insertion loss and return loss of the cable may be checked as part of a quality assurance process before it is provided to a customer. However, once a cable has been deployed it is uncommon for a technician or field-service engineer to characterise a cable due to the size and cost of vector network analysers.

It is desirable to allow characterisation of a cable once it has been deployed using a compact, accurate system.

SUMMARY

There is provided a method for determining a characteristic of a cable or transmission line. In the method, the following steps are performed: obtaining one or more echo responses of the cable or transmission line using time domain reflectometry; and comparing the frequency domain characteristics of the one or more echo responses to determine an impedance, insertion loss or return loss of the cable or transmission line. By doing this, cable characteristics can be efficiently determined pre and post-commissioning.

According to a first aspect of the disclosure there is provided a method for characterising a cable or transmission line, the method comprising: obtaining a first echo response using time domain reflectometry; coupling a first end of the cable or transmission line to a time domain reflectometer; obtaining a second echo response using time domain reflectometry; determining a characteristic of the cable or transmission line by comparing the first echo response and the second echo response.

According to a second aspect of the disclosure there is provided a method for characterising a cable or transmission line, the method comprising: obtaining a first echo response using time domain reflectometry from a first end of a cable or transmission line using a first time domain reflectometer whilst a second end of the cable is coupled to a second time domain reflectometer; obtaining a second echo response using time domain reflectometry from the second end of the cable or transmission line whilst the first end of the cable or transmission line is coupled to the first time domain reflectometer; identifying a first complete reflection in the first echo response, the first reflection corresponding to an impedance mismatch between the first time domain reflectometer and the cable or transmission line; identifying a second complete reflection in the second echo response, the second complete reflection corresponding to an impedance mismatch between the cable or transmission line and the first time domain reflectometer coupled at the first end of the cable; determining a ratio of a fast Fourier transform of the first complete reflection within the first echo response to a fast Fourier transform of the second complete reflection within the second echo response; taking a logarithm of the ratio to determine the insertion loss of the cable in decibels.

According to a third aspect of the disclosure there is provided a method for characterising a cable or transmission line, the method comprising: obtaining a first echo response of a time domain reflectometer using time domain reflectometry; coupling a first end of the cable or transmission line to a time domain reflectometer; obtaining a second echo response of the cable or transmission line using time domain reflectometry; determining a return loss of the cable or transmission line by comparing the first echo response and the second echo response.

BRIEF DESCRIPTION OF THE DRAWINGS

Aspects of the disclosure will now be described by way of example only and with reference to the accompanying drawings, wherein like reference numerals refer to like parts, and wherein.

DETAILED DESCRIPTION

Figure 1:
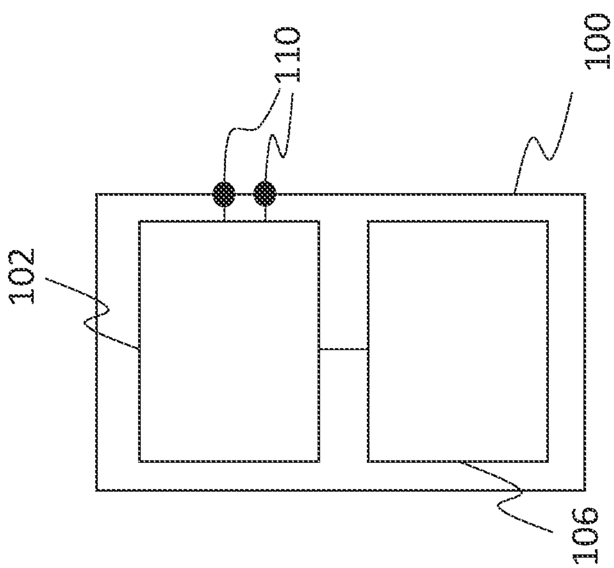
FIG. 1 is a schematic representation of a time domain reflectometry system.

Cables or transmission lines may be used in communication systems to allow data to be transmitted between a transmitter or transceiver and receiver or transceiver. For example, ethernet cables are commonly used in both residential and industrial settings.

Cables and transmission lines may be made to different quality standards and have different characteristics depending on their intended use. For example, some cables or transmission lines may allow communication over a 100 m distance before the transmitted signal is degraded to such an extent that it cannot be recovered. Other cables or transmission lines may allow communication of 1000 m or more before the transmitted signal is degraded. Different cables may also have different characteristics that may allow the utilization of different communication protocols with different bandwidths. The bandwidth of a cable is a measure of how much data can be transmitted within a period of time.

Each of the different cables or transmission lines may have a number of characteristics specified by the manufacturer, such as the insertion loss of the cable, the return loss of the cable and the impedance of the cable. Manufacturers may test cables as part of quality assurance during manufacture to ensure that these characteristics fall within acceptable bounds. Equipment, such as a vector network analyser may be used as part of the test process.

Vector network analysers are large, expensive pieces of equipment and may be difficult to use without the correct training. Both ends of the cable must be connected to the vector network analyser in a lab setting to determine the cable characteristics. In many settings, following manufacture of a cable, these characteristics may never be tested again due to the price and impracticality of using a vector analyser outside of a laboratory.

Many buildings include a number of historically installed cables that may be intended to be reutilized with a more modern communication protocol. Further, it is typical for only one end of the cable to be in an accessible position. The ability to easily determine the characteristics of these cables may allow them to be re-used. This reduces the need to dispose of and replace the historic cable, further reducing the cost to upgrade building communication systems.

A time domain reflectometer (TDR) transmits a first signal along a cable or transmission line and receives an echo response including a number of reflections. The reflections may be caused by impedance mismatches along the cable or transmission line, for example due to the change in impedance at the start and end of the cable or transmission line.

Time domain reflectometers may be included in some communication systems, such as within an integrated circuit that forms part of a transceiver (a system capable of transmitting and receiving communications). Using the time domain reflectometer to determine characteristics of the cable or transmission line may allow regular or periodic checks of the cable's characteristics and the re-use of historically installed cables.

Echo responses may be obtained whilst the time domain reflectometer and cable are coupled in different configurations, for example, whilst the time domain reflectometer system is decoupled from a cable or transmission line and whilst the time domain reflectometer is coupled to a cable or transmission line. Further, the termination of the ends of the time domain reflectometer may be modified. Obtaining and comparing a number of echo responses using the time domain reflectometer allows the characteristics of the cable or transmission line to be determined.

FIG. 1 is a schematic representation of a time domain reflectometry system 100. The system 100 includes a time domain reflectometer 102. The time domain reflectometer 102 is configured to transmit or output a transmission signal to a pair of output terminals 110 of the system and receive an echo response or reflected signal. The time domain reflectometer 102 may transmit any suitable transmission signal, such as a pseudo-random sequence of transmission symbols. The time domain reflectometer 102 is coupled to a control system 106. The time domain reflectometer provides the received echo response to the control system 106.

The time domain reflectometer 102 and control system 106 may be implemented separately or as part of a larger communication transceiver system. For example, the time domain reflectometer 102 may be integrated with the transceiver.

The echo responses obtained by the time domain reflectometer 102 of FIG. 1, or any echo response obtained by a time domain reflectometer or transceiver capable of time domain reflectometry, may be obtained by transmitting a pseudo random sequence of transmission symbols or other type of signal with a power spectral density containing the frequency range of interest for a given communication standard or transceiver specification.

Where the time domain reflectometer 102 forms part of the larger transceiver or communication system, it is desirable to understand the characteristics of the cable or transmission line 104 for the specific communication system. This may be achieved by transmitting a pseudo-random sequence of transmission symbols with a power spectral density that is within the frequency range of interest for the communication system. The frequency range of interest for the communication system may be the frequency range or spectrum within which the communication system or transceiver transmits data during communication.

Figure 2:
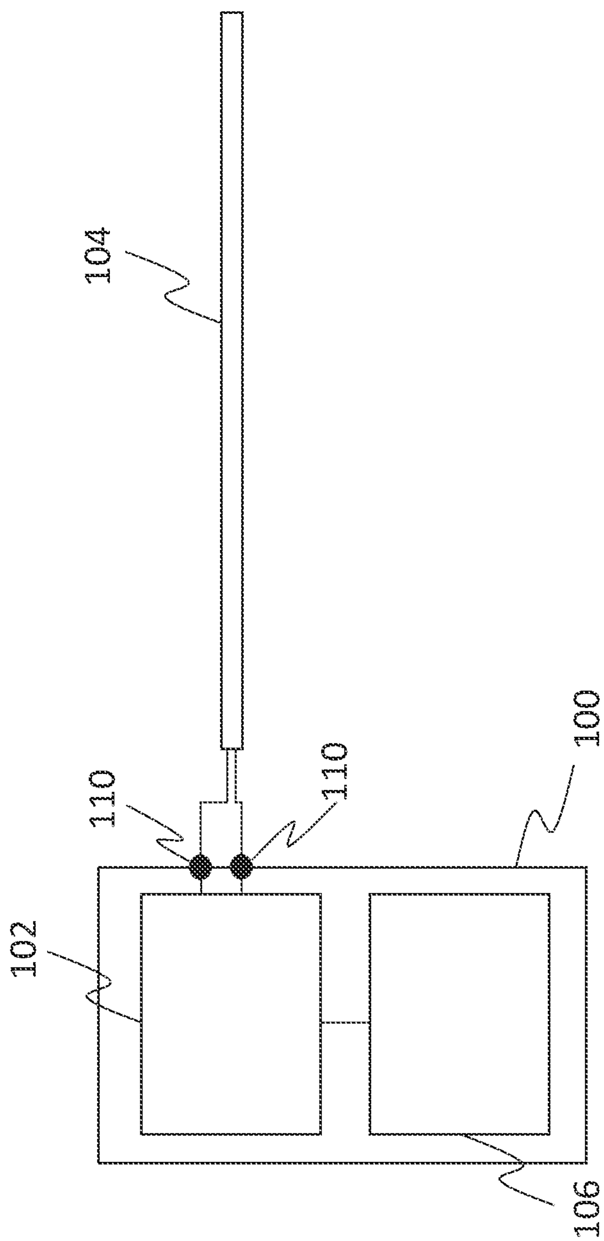
FIG. 2 is a schematic representation of a time domain reflectometry system coupled to a cable or transmission line.

FIG. 2 is a schematic representation of the time domain reflectometry system 100 coupled to the first end of a cable or transmission line 104 at the output terminals 110 of the system 100. The second end of the cable or transmission line 104 is not coupled to any load or device, and as such the second end is disconnected or open-circuited. The time domain reflectometer 102 is configured to output a signal to the cable or transmission line 104 and receive an echo response including a number of reflections caused by the changing impedance of the cable or transmission line 104. The coupling between the time domain reflectometer 102 and the cable or transmission line 104 may be a differential connection or a single-ended connection. The cable 104 may comprise a differential pair of data line or a single ended data line. The TDR 102 may be connected to the two data lines of the cable or transmission line 104.

The time domain reflectometry system 100 is coupled to a first end of the cable or transmission line 104 and configured to obtain at least one echo response of the cable or transmission line 104 using time domain reflectometry. However, the system 100 may be additionally or alternatively be coupled to the second end of the cable or transmission line 104 and configured to obtain at least one echo response of the cable or transmission line 104 using time domain reflectometry.

Figure 3:
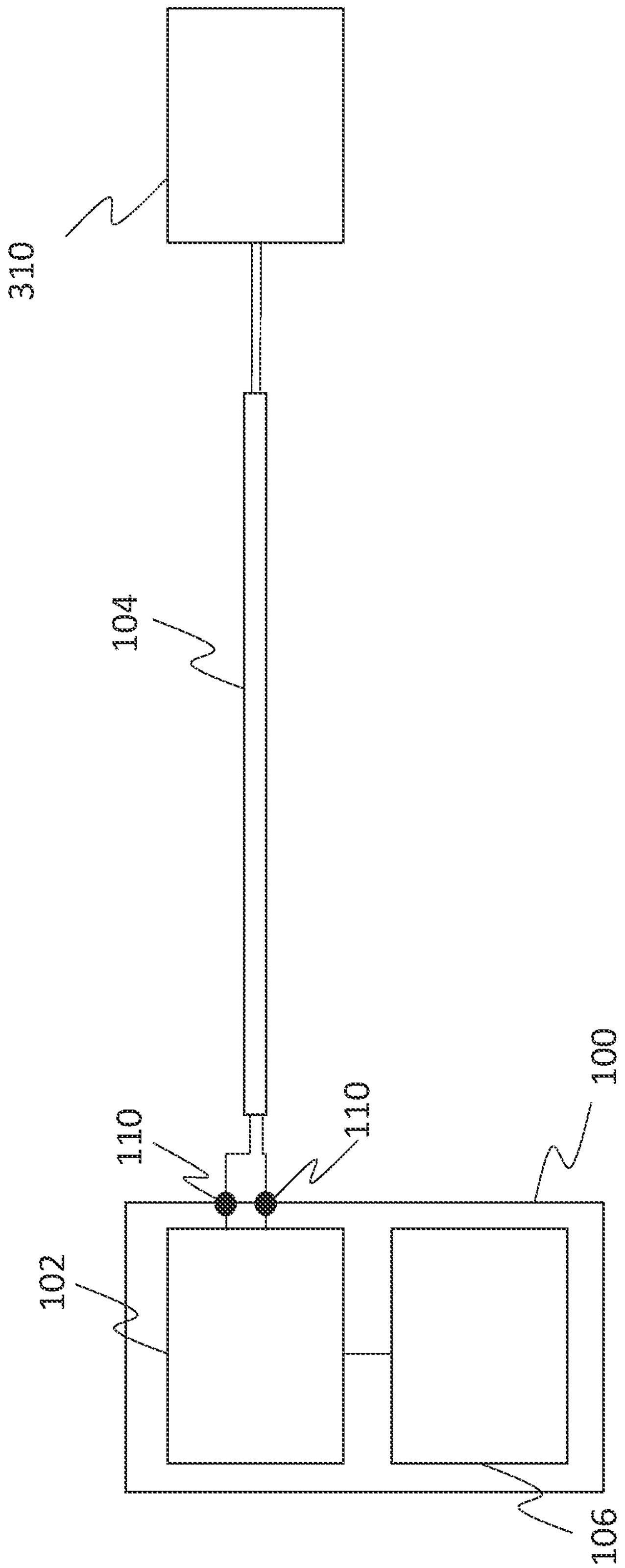
FIG. 3 is a schematic representation of a time domain reflectometry system coupled to a cable or transmission line, with the second end of the cable coupled to a device.

FIG. 3 is a schematic representation of the time domain reflectometry system 100 coupled to a cable or transmission line 104 at the output terminals 110 of the system 100. The second end of the cable or transmission line is coupled to a device 310. The device 310 may be a receiver or transceiver which uses the cable or transmission line 310 for communication. Alternatively, the device 310 may be a load with an impedance matched to an impedance of the cable or transmission line. Whilst the exact impedance of the cable or transmission line may be unknown, typical matching impedances, such as 50 ohm, 75 ohm or 100 ohm impedances, may be used. For example, an impedance according to the reference impedance stated by a given communication standard. The device 310 may be a second time domain reflectometer capable of obtaining echo responses of the cable or transmission line 104.

Figure 4:
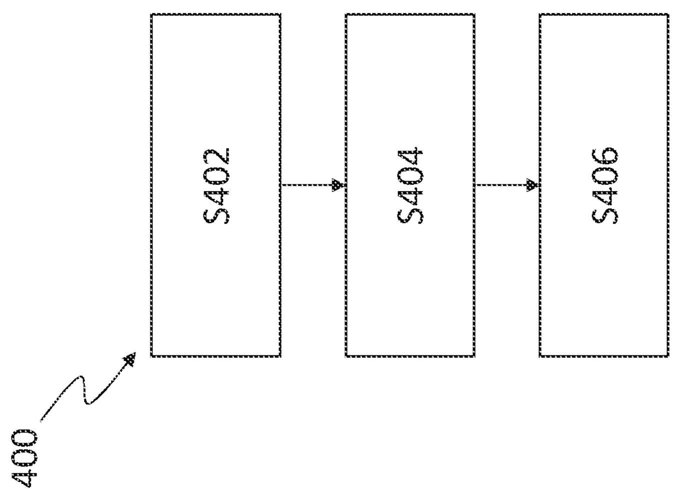
FIG. 4 shows a flowchart of a method for determining a characteristic of a cable or transmission line.

FIG. 4 is a flowchart outlining a method 400 for characterising a cable or transmission line 104. The method may be performed by the control system 106 of the system 100. Alternatively, the method may be performed by a separate control system that is not couped to the cable, but that receives the echo response from the time-domain reflectometer 102. The control system 106 may obtain the echo responses from a memory or request/receive updated echo responses from the time domain reflectometer 102.

At step S402, a first echo response is obtained using time domain reflectometry. The first echo response may comprise an echo response obtained whilst the time domain reflectometer 102 is not coupled to the cable or transmission line 104, as shown in FIG. 1. As such, the first echo response represents an echo response of the open output of the time domain reflectometer 102 or the system 100 within which the time domain reflectometer 102 is part. This provides an echo response including information relating to the system 100. The first echo response may be obtained from the expected behaviour of the reflectometer or during manufacture of the device and stored in a memory of the system 100. Alternatively, the first echo response may be obtained following commissioning of the of the system 100 or transceiver containing the time domain reflectometer 102 and obtained regularly or periodically.

At step S404, a second echo response is obtained using time domain reflectometry. The second echo response may comprise an echo response obtained whilst the time domain reflectometer 102 is coupled to the cable or transmission line 104. Step S404 therefore comprises coupling a first end of the cable or transmission line to the time domain reflectometer 104, as shown in FIG. 2 and FIG. 3. As such, the second echo response comprises reflections resulting from the impedance variations of the front end circuitry of the time domain reflectometer 102, reflections resulting from the impedance mismatch between the time domain reflectometers 102 output terminals 110 and the cable or transmission line and reflections caused by impedance variations of the cable or transmission line 104 itself. Where the first echo response is obtained from a memory of the system 100, the cable or transmission line may already be coupled to the time domain reflectometer.

At step S406, a characteristic of the cable or transmission line 104 is determined by comparing the first echo response and the second echo response. The first echo response and second echo will include a number of reflections indicative of changing impedances in the time domain reflectometer system 100 and the cable or transmission line 104. By comparing them, characteristics of the cable or transmission line 104, such as an impedance, return loss or insertion loss are determined.

Return Loss and Impedance Determination

Figure 5A:
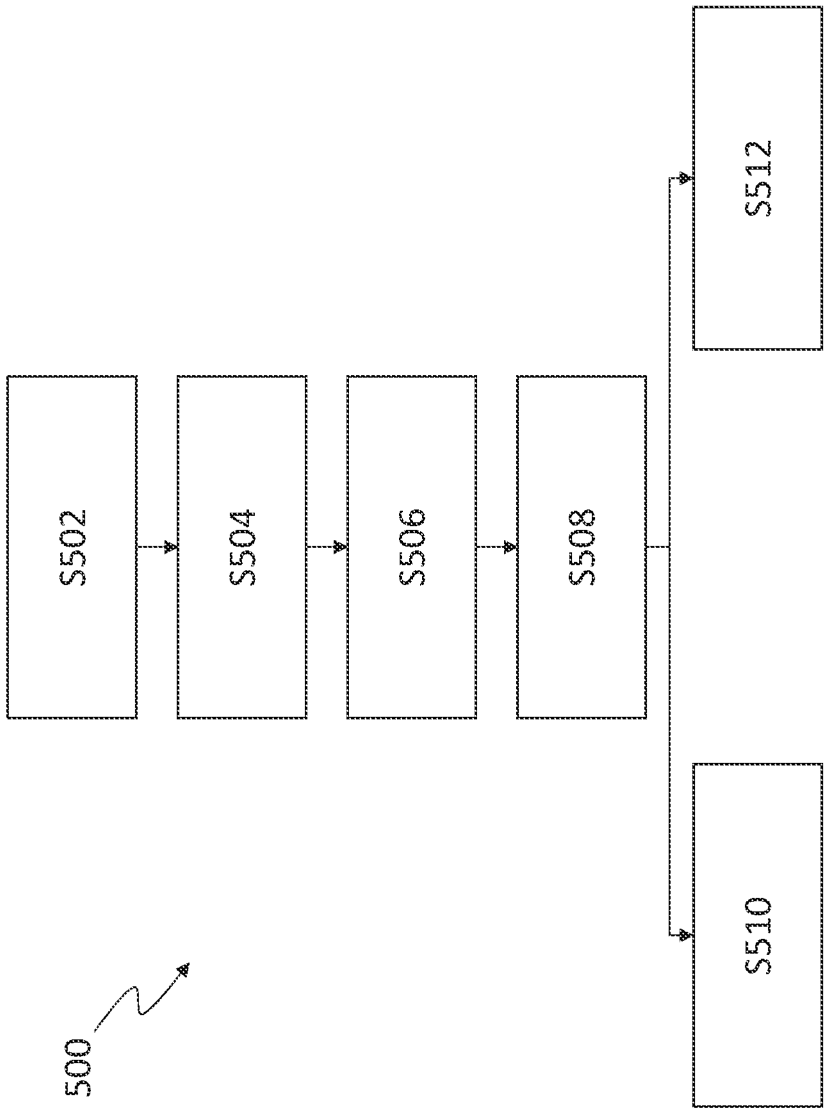
FIG. 5*a* shows a flowchart of a method for determining a return loss and impedance of a cable or transmission line.

FIG. 5*a* is a flowchart outlining a method 500 for characterising a cable or transmission line 104, where the characteristic comprises a return loss and impedance of the cable or transmission line 104. The method may be performed by the control system 106 of the system 100. Alternatively, the method may be performed by a separate control system that is not couped to the cable, but that receives the echo response from the time-domain reflectometer 102.

At step S502, a first echo response is acquired using time domain reflectometry. The first echo response is obtained whilst the time domain reflectometer 102 is decoupled from the cable or transmission line 104. As such, the first echo response represents the echo response of the open output of the time domain reflectometer 102 or the system 100. This provides an indication of the frequency spectrum properties of the time domain reflectometer 102 up to the output terminals 110 as shown in FIG. 1.

At step S504, the first end of a cable or transmission line 104 is coupled to the time domain reflectometer 102 at the output terminals 110 of the system 100. The second end of the cable or transmission line is coupled to a device 310 as shown in FIG. 3. As such, the second end of the cable or transmission line 104 is terminated using a matched impedance. The termination may be achieved using a receiver or transceiver used for communication or an impedance matched to an impedance of the cable or transmission line.

Whilst the method of FIG. 5*a* includes a step of coupling the time domain reflectometer 102 to the cable or transmission line, it should be appreciated that the time domain reflectometer may already be coupled to the cable or transmission line 104. The first echo response may be an echo response obtained from a memory of the system 100, for example an echo response obtained during manufacture or commissioning of the system 100.

At step S506, a second echo response is obtained whilst the second end of the cable or transmission line 104 is terminated using the load, matched load or communication system 310. Whilst the method of FIG. 5 utilises a second echo response obtained whilst the second end of the cable or transmission line is terminated using the load, alternatively a second echo response obtained whilst the second end of the cable or transmission line is open-circuited may instead be used. Where an open-circuited echo response is used, the reflection generated by the open-circuit at the end of the cable or transmission line 104 should be excluded from the following calculations, for example by considering only the samples of the echo response that do not include the reflection caused by the impedance change at the second end of the cable or transmission line 104.

At step S508, a first fast Fourier transform of the first echo response is generated and a second fast Fourier transform of the second echo response is generated. This converts the time domain representation of the echo response to a frequency domain representation of the echo response. A ratio of the first fast Fourier transform and second fast Fourier transform is generated. This provides a value representative of the reflection coefficient of the cable or transmission line.

As is known, the reflection coefficient of a cable or transmission line is determined by the following equation:

$$\text{reflection coefficient} = r = \frac{Z_n - 1}{Z_n + 1}$$

$$Z_n = Z/Z_0$$

Where $Z_0$ is the characteristic impedance of the reflectometer and Z is the impedance of the cable of transmission line.

The reflection coefficient may be found by taking the ratio of the transforms of the first echo response to or over the second echo response, where both Fast Fourier Transformations are given in RMS units:

$$r = \frac{FFT(\text{First Echo Response})}{FFT(\text{Second Echo Response})}$$

From this, the return loss of the cable or transmission line may be determined in decibels:

$$\text{Return Loss} = RL = 10\log_{10}r^2$$

$$RL = 20 * \log_{10}\frac{FFT(\text{First Echo Response})}{FFT(\text{Second Echo Response})}$$

The use of a logarithm may be considered to be an optional step to obtain the return loss in decibels. It should be understood that no logarithm may be taken and the return loss will be provided by the square of the reflection coefficient. Wherever a logarithm is described in the application, the logarithm may instead not be used, and the resulting characteristic provided using units other than decibels.

From the previous equations, the impedance of the cable or transmission line may then be derived from the reflection coefficient:

$$Z = Z_N * Z_0$$

Thus in a system that used 100 Ohm as the reference impedance:

$$Z = 100\left(\frac{r+1}{(1-r)}\right)$$

As such, the reflection coefficient can be calculated by taking the ratio of the first and second fast Fourier transforms.

Once the reflection coefficient of the cable or transmission line is determined in step S508, the return loss and impedance of the cable or transmission line may be calculated according to the above equations.

At step S510, the return loss of the cable or transmission line is determined by taking a logarithm ($20*\log_{10}$ r) of the reflection coefficient to determine the return loss of the cable in decibels.

At step S512, the impedance of the cable or transmission line may be determined by determining a ratio of the reflection coefficient of the cable or transmission line. As highlighted above, the impedance of the cable or transmission line 104 may be determined using the following equation:

$$Z = Z_N * Z_0$$

Particularly, in a 100 ohm impedance system:

$$Z = 100\left(\frac{r+1}{(1-r)}\right)$$

Figure 5B:
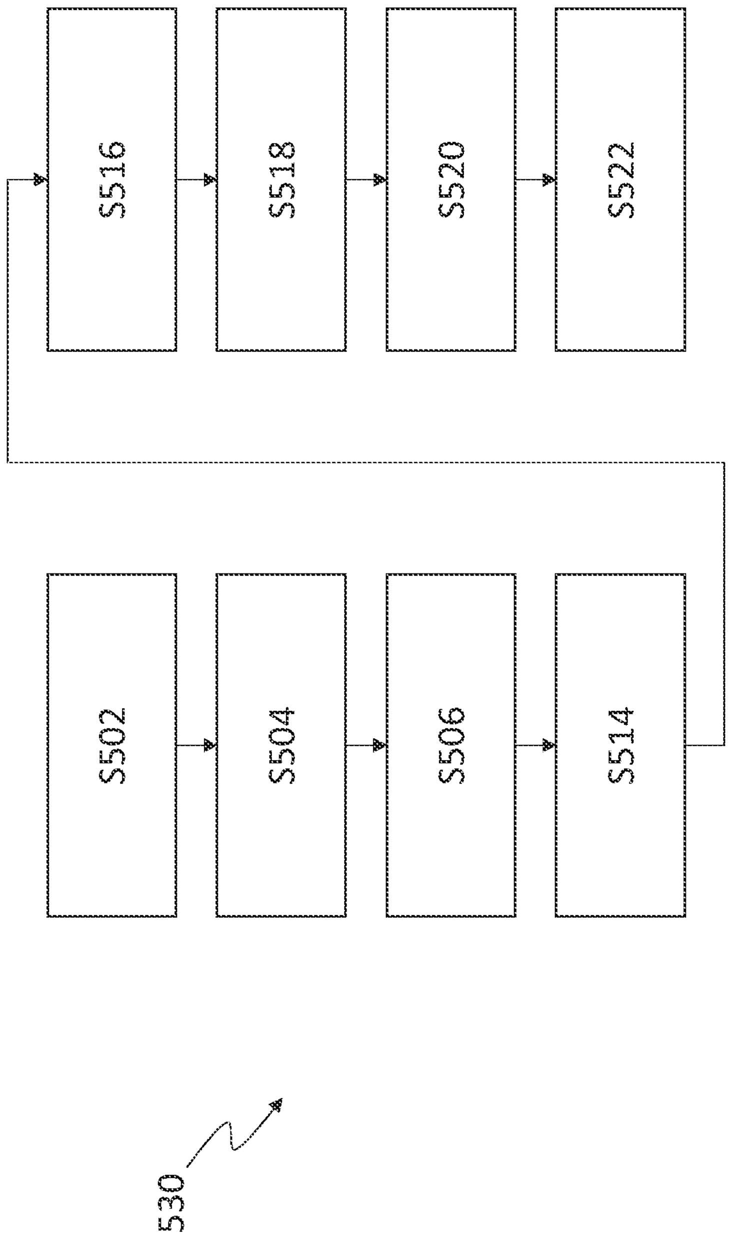
FIG. 5*b* shows a flowchart of a method for determining a return loss whilst reducing the effects of a non-ideal time-domain reflectometer.

FIG. 5*b* shows an adapted or alternative version of the method 530 of FIG. 5*a* which removes or reduces the effects of non-idealities of the time domain reflectometer 102 in the return loss determination. Steps S502-S506 are the same as those described with respect to FIG. 5*a*, obtaining a first echo response and a second echo response of the cable or transmission line 104.

In step S514, the cable or transmission line 104 is decoupled or disconnected from the time domain reflectometer 102. The output terminals 110 of the time domain reflectometer 102 are terminated or coupled to an impedance matched to the nominal impedance of the time domain reflectometer 102. Whilst the impedance of the time domain reflectometer 102 may vary over time, the impedance may be matched to the stated or data-sheet provided impedance of the time domain reflectometer 102.

In step S516, a third echo response is obtained whilst the output terminals 110 of the time domain reflectometer 102 are terminated using the matched impedance.

Steps S514 and S516 are shown in the method of FIG. 5*b* after steps S504 and S506, however it should be appreciated that steps S514 and S516 may instead take place before step S504. Further, the third echo response may be obtained during the manufacture of the time domain reflectometer 102 or on the first use of the time domain reflectometer 102 and stored in a memory for later use. Or taken every time to account for the impedance changes on the reflectometer.

In step S518 the third echo response is subtracted from the second echo response to generate a relative frequency response of the cable. The subtraction may be a power subtraction, with the fast Fourier transform of the third echo response subtracted from the fast Fourier transform of the second echo response. As such, the terminated echo response of the time domain reflectometer 102 is subtracted from the echo response of the cable or transmission line 104 whilst the second end of the cable or transmission line 104 is terminated using the load. This results in the non-idealities of the time domain reflectometer 102 being removed from the echo response before the return loss is determined, and the relative frequency response of the cable without the effects of the transmitter or reflectometer 102 included.

$$(\text{Relative Frequency response of cable})\char`^2 = FFT(\text{second echo response})^2 - FFT(\text{third echo response})^2$$

In step S520, a ratio of a fast Fourier transform of the first echo response to the relative frequency response of the (which is already a fast Fourier transform/frequency response) is taken to determine a reflection coefficient of the cable or transmission line:

$$r = \pm \frac{FFT(\text{First Echo Response})}{FFT(\text{Relative Frequency response of cable})}$$

In step S522 a logarithm of the ratio may be taken to determine the return loss of the cable or transmission line in decibels.

$$RL = 20 * \log_{10} \frac{FFT(\text{First Echo Response})}{FFT(\text{Relative Frequency response of cable})}$$

In this way, the return loss of the cable or transmission line may be determined. The value of return loss obtained using the method of FIG. 5*b* may be more accurate than the method of FIG. 5*a*, as it removes the non-idealities of the time domain reflectometer, however it requires further echo responses to be obtained.

Figure 6:
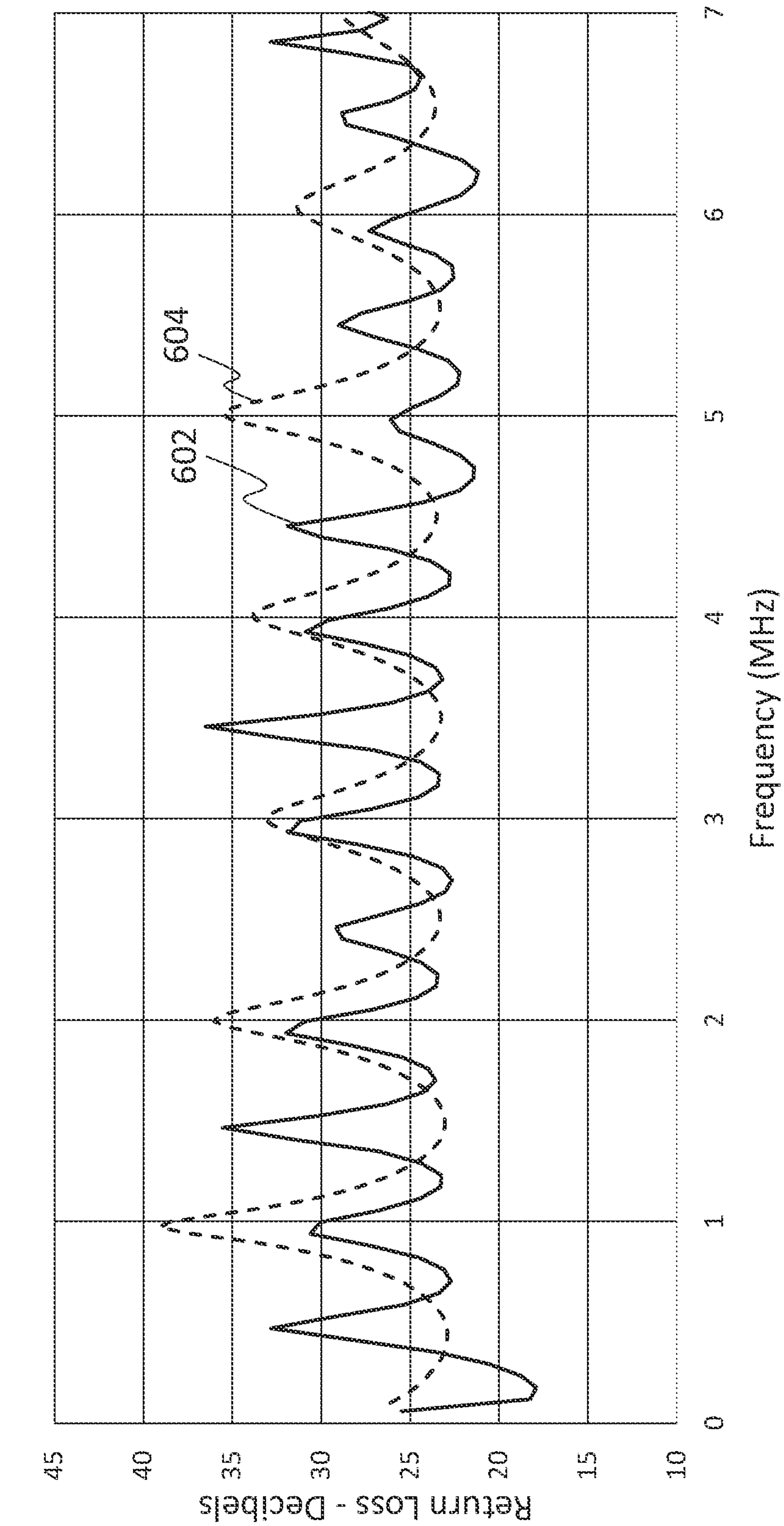
FIG. 6 is a graph showing a comparison of return loss determined using a vector analyser and a time domain reflectometry method.

FIG. 6 is a graph showing the determined return loss of the cable or transmission line 104. The return loss of the cable or transmission line was analysed using a vector analyser and the previously described time domain reflectometry method. The return loss determined using the time domain reflectometry method is displayed as solid line 602. The return loss determined using a vector analyser is displayed as line 604. As can be seen, there is a close mapping between the return loss determined using the two methods.

Figure 7:
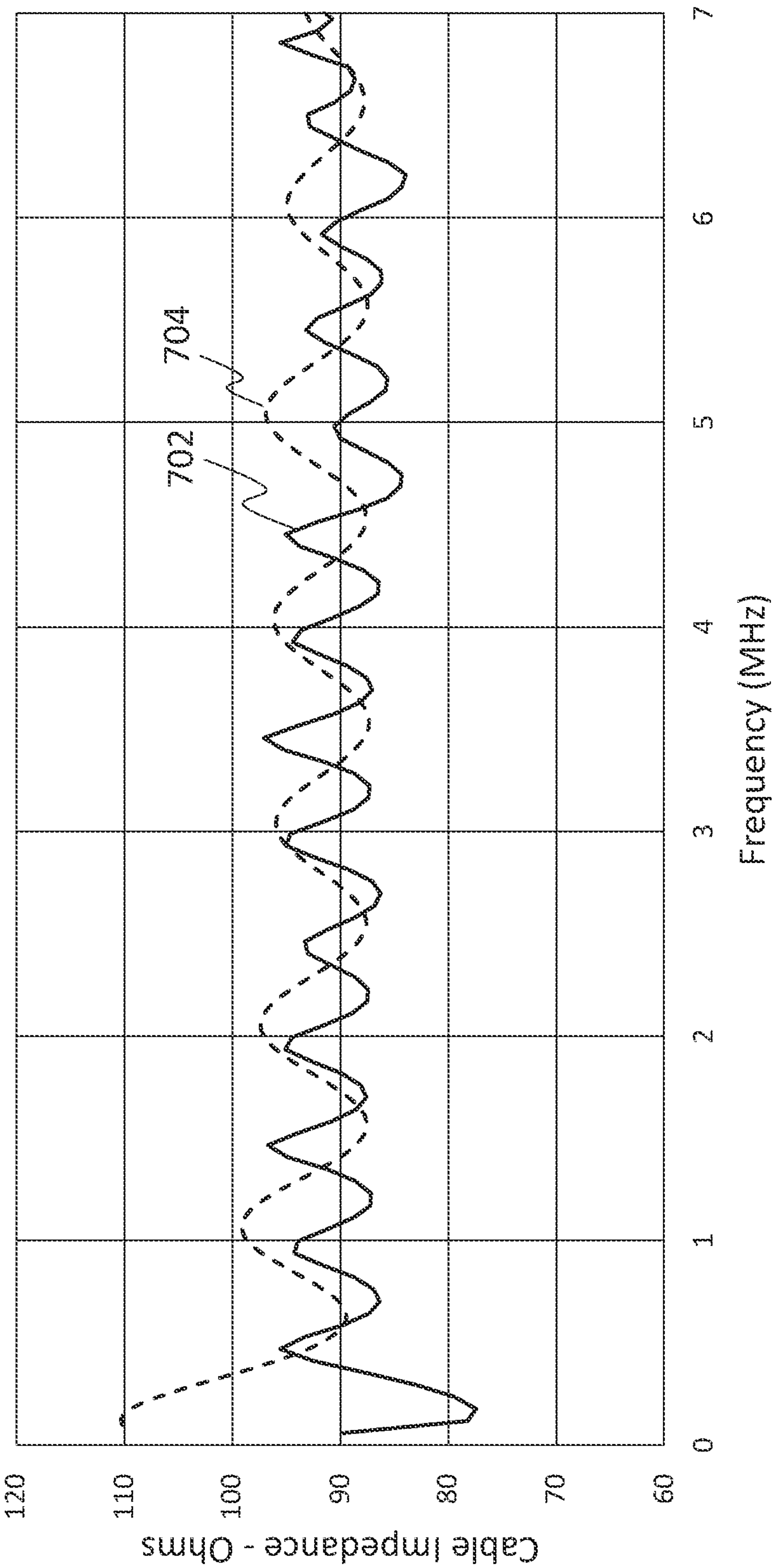
FIG. 7 is a graph showing a comparison of impedance determined using a vector analyser and a time domain reflectometry method.

FIG. 7 is a graph showing the determined impedance of the cable or transmission line 104. The impedance of the cable or transmission line for the cable was analysed using a vector analyser and the time domain reflectometry methods outlined above. The impedance determined using the time domain reflectometry method is displayed as solid line 702. The impedance determined using the vector analyser is displayed as dashed line 704. As can be seen, there is a close mapping between the impedances determined using the two methods.

Insertion Loss Determination

Figure 8A:
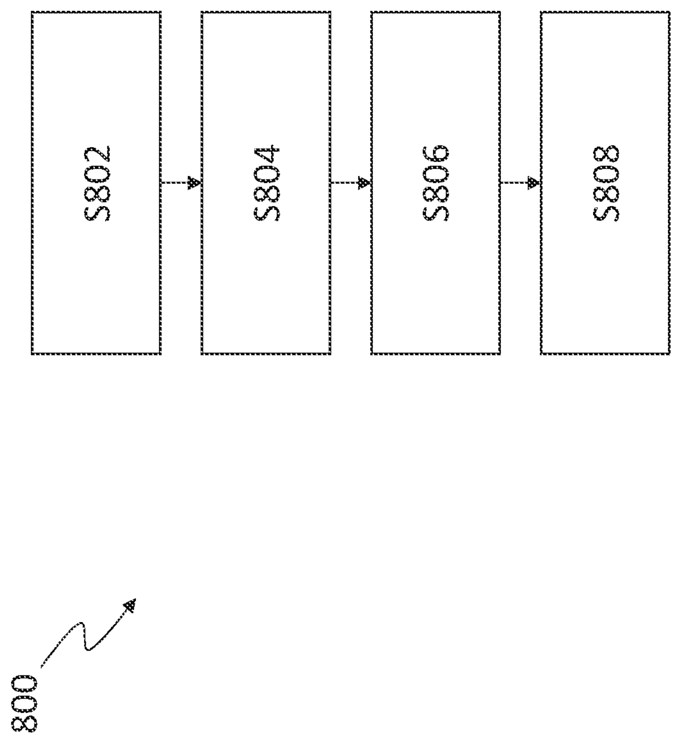
FIG. 8*a* shows a flowchart of a method for determining an insertion loss of a cable or transmission line.

The insertion loss of the cable or transmission line may also be determined using the method of FIG. 8*a*.

FIG. 8*a* is a flowchart outlining a method 800 for characterising a cable or transmission line 104, where the characteristic comprises an insertion loss of the cable or transmission line 104. The method may be performed by the control system 106 of the system 100. Alternatively, the method may be performed by a separate control system that is not couped to the cable 104, but that receives the echo response from the time-domain reflectometer 102.

At step S802, a first echo response is acquired using time domain reflectometry. The first echo response is obtained whilst the time domain reflectometer 102 is decoupled from the cable or transmission line 104. As such, the first echo response represents an echo response of the open output terminals 110 of the time domain reflectometer 102 or the system 100. This provides an indication of the properties of the system 102 up to the output terminals 110 as shown in FIG. 1.

Figure 9:
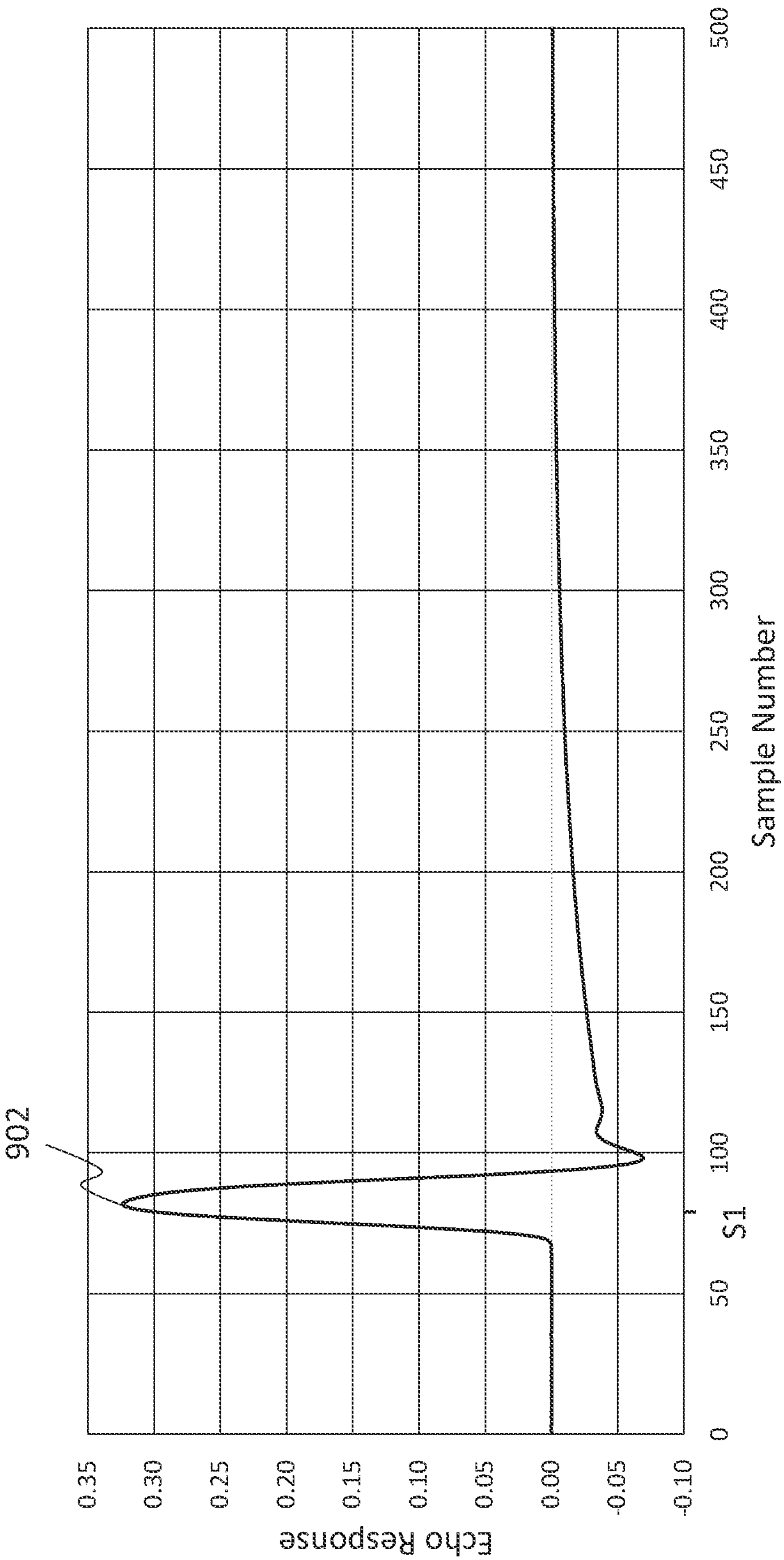
FIG. 9 is a graph showing a first echo response obtained whilst the time domain reflectometer is decoupled from the cable or transmission line.

FIG. 9 is a graph showing a first echo response obtained whilst the time domain reflectometer 102 is decoupled from the cable or transmission line 104.

At step S804, the first end of a cable or transmission line 104 is coupled to the time domain reflectometer 102 at the output terminals 110 of the system 100. The second end of the cable or transmission line is not coupled to a device or load, as shown in FIG. 2. As such, the second end of the cable or transmission line 104 is open-circuited. The open circuit may be achieved by decoupling (or not coupling) a device 310 used for communication from the second end of the cable or transmission line. Alternatively, where the second end of the cable or transmission line is coupled to a device that terminates the cable 104 actively, the open-circuit may be achieved by powering off or turning off a device coupled to the second end of the cable or transmission line 104. In this way, when the device is powered off, it behaves like an open-circuit. This may be achieved, for example, by opening a switch coupled between the second end of the cable or transmission line and the device 310.

At step S806, a second echo response is obtained whilst the second end of the cable or transmission line 104 is open-circuited or decoupled.

Figure 10A:
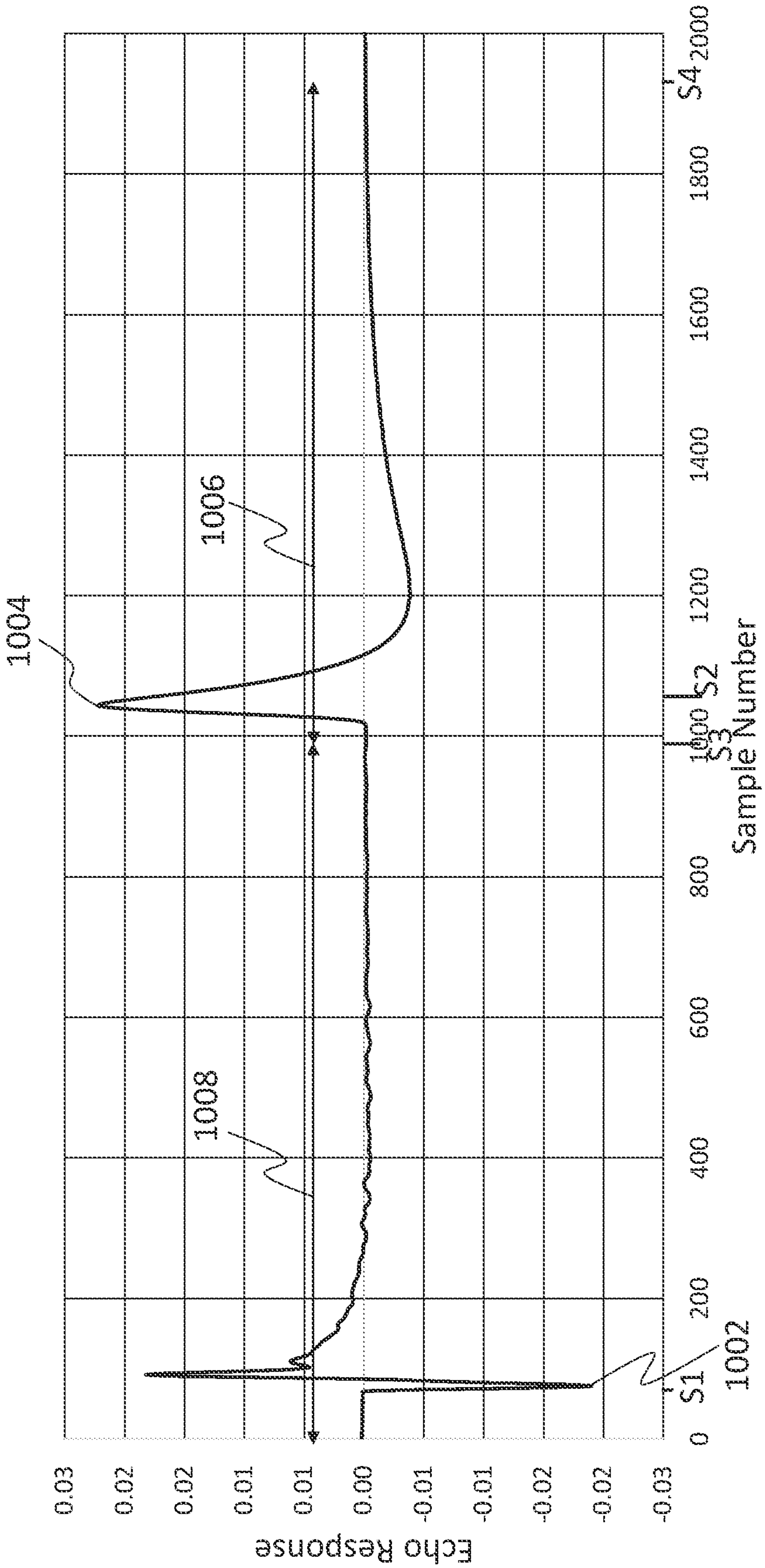
FIG. 10*a* is a graph showing a second echo response obtained whilst the second end of the cable or transmission line is open-circuited or decoupled.

FIG. 10*a* is a graph showing a second echo response obtained whilst the second end of the cable or transmission line 104 is open-circuited or decoupled.

At step S808, a first fast Fourier transform of the first echo response is generated and a second fast Fourier transform of the second echo response is generated. A ratio of the first fast Fourier transform and second fast Fourier transform is generated. The insertion loss of the cable or transmission line 104 in decibels is determined by taking a logarithm ($20*\log_{10}$ ratio) of the ratio as shown in the below equation:

$$\text{Insertion Loss} = IL = \frac{1}{2} * 20 * \log_{10}\left(\frac{FFT(\text{First Echo Response})}{FFT(\text{Second Echo Response})}\right)$$

The factor of ½ included in the ratio is provided because the second echo response is affected by the insertion loss of the cable twice as the transmitted signal travels through the cable and back to the reflectometer. The open-circuit results in a signal travelling from the time domain reflectometer, reflecting from the second end of the cable or transmission line and back to the time domain reflectometer. As such, the signal travels twice the length of the cable or transmission line 104. Multiplying the logarithmic result by ½ corrects for this.

Figure 8B:
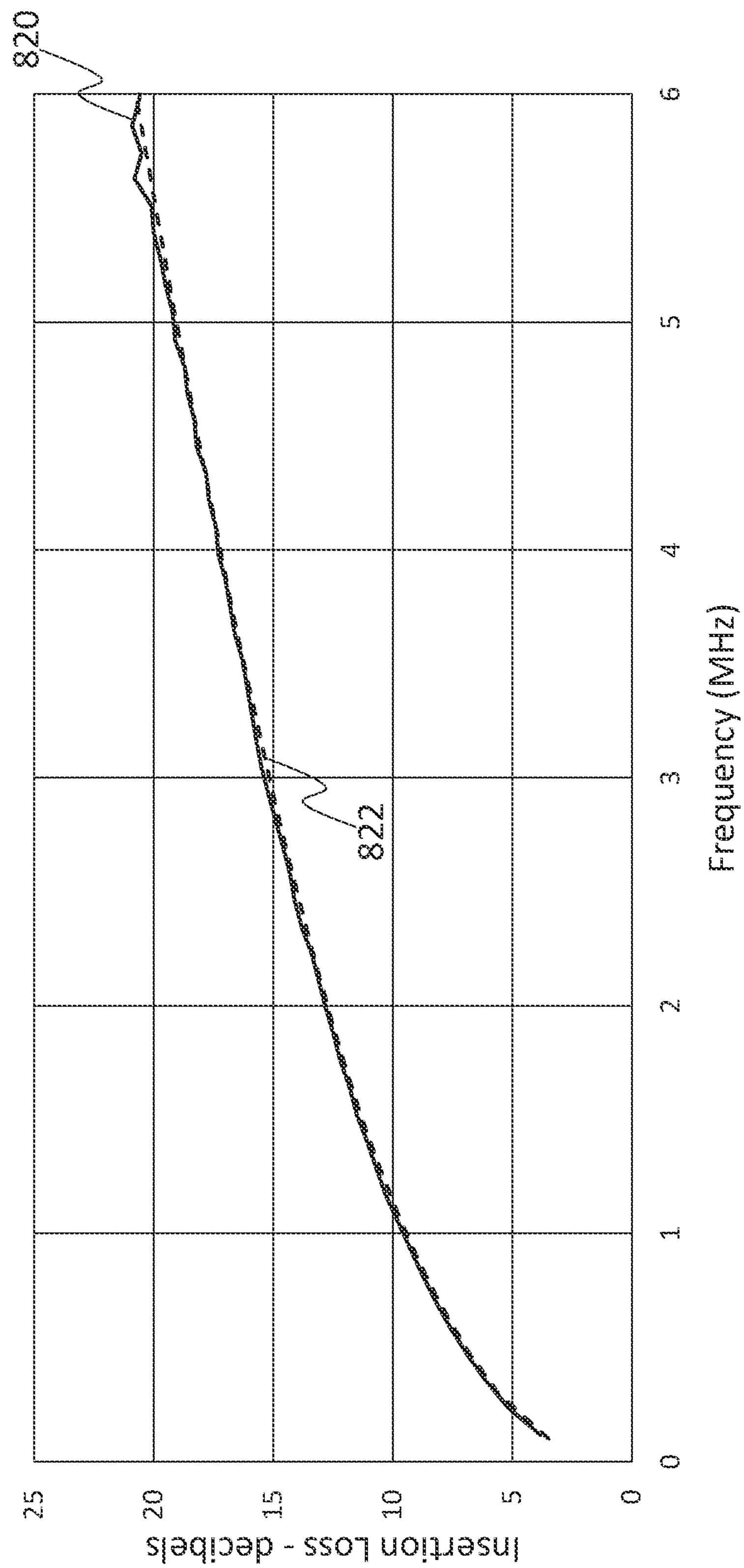
FIG. 8*b* is a graph showing a comparison of insertion loss determined using a vector analyser and a time domain reflectometry method.

FIG. 8*b* is a graph showing the determined insertion loss of the cable or transmission line 104. The insertion of the cable or transmission line for the cable was analysed using a vector analyser and the time domain reflectometry methods outlined below. The insertion determined using the time domain reflectometry method is displayed as solid line 820. The insertion loss determined using the vector analyser is displayed as dashed line 822. As can be seen, there is a close mapping between the insertion loss determined using the two methods.

Sample Selection

Echo responses acquired using time domain reflectometry systems are, typically, sampled or discrete signals, indicating the amplitude of the reflection at different sample numbers. The sample numbers are related to the distance along the cable (or from the time domain reflectometer) at which the sample is acquired. Reflections in the echo responses are caused by impedance changes in the system 102, or cable 104, and represented by amplitude peaks in the echo response.

The first echo response shown in FIG. 9 is obtained whilst the time domain reflectometer 102 is decoupled from the cable or transmission line 104. This first echo response includes a first reflection 902 at a first sample number S1. This first reflection 902 is caused by the impedance change at the output terminals 110 of the system 100.

The second echo response shown in FIG. 10*a* is obtained whilst a cable or transmission line 104 is coupled to the reflectometer 102 and the second end of the cable or transmission line 104 is open-circuited or decoupled. The second echo response includes a first reflection 1002 which is obtained at the same first sample number S1 as the first reflection 902 of the first echo response. As the impedance of the cable is not ideal, there is an impedance mismatch between the time domain reflectometer 102 and the cable 104. The first reflection 1002 in the second echo response is caused by the impedance mismatch between the reflectometer 102 impedance (which may be, for example, 50, 75 or 100 ohms) and the impedance of the cable or transmission line.

The first reflections 902, 1002 correspond to the same point at the output terminals 110 of the system 100 (or between the output terminals and the cable or transmission line). However, in the first echo response where there is no cable, the amplitude reflection is larger (due to the large impedance change at the open-circuited output of the time domain reflectometer) compared to the reflection in the second echo response (which is caused by a relatively smaller impedance mismatch between the reflectometer 102 and the cable 104).

The second echo response shown in FIG. 10*a* further comprises a second reflection 1004 at a second sample number S2. The second reflection 1004 has a higher sample number than the first reflection 902, 1004 and is caused by the impedance change at the open circuit at the second end of the cable or transmission line 104.

The amplitude or magnitude of the second reflection 1004 depends on the length of the cable. The longer the cable, the lower the magnitude of the second reflection 1004 due to the insertion loss of the cable. FIG. 10*a* shows the second reflection 1004 having a magnitude only slightly larger when compared to the first reflection 1002. This can cause the first reflection 1002, representative of the output terminals 110 of the system 100, to considerably affect the determination of the insertion loss of a cable or transmission line 104 when the cable is long and in general, produce inaccuracies in the insertion loss calculation.

To avoid this, a number of samples of the echo responses may be selected for use in the determination of the insertion loss. Further, the selected samples may be padded with zeros or other values to complete the waveform. The same is true for the echo responses used for the determination of the return loss and impedance of a cable or transmission line.

When determining respective fast Fourier transforms of the first echo response and second echo response (for example in step S508 and S808) a predetermined set of samples of the first echo response and second echo response may be used in the fast Fourier transforms, rather than the entire echo response.

The predetermined set of samples may be determined with reference to the second echo response. For example, as shown in FIG. 10*a*, a predetermined set of samples 1006 or sample window 1006 including the samples between a third sample number S3 and a fourth sample number S4 may be selected in the second echo response for the insertion loss determination.

For the insertion loss calculation, the predetermined set of samples 1006 may be chosen in dependence on the determination of the presence of the first reflection 1002 and second reflection 1004 in the second echo response, with the predetermined set of samples selected such that they include the second reflection (more particularly the peak of the second reflection 1004) and do not include the first reflection. The sample window or predetermined set of samples may be a fixed number of samples before and after the second reflection 1004. The predetermined set of samples may include the first sample of the second reflection 1004 and a predetermined number of samples following the first sample. A number of different ways to determine the sample window are possible.

The selected samples from the first echo response for the insertion loss calculation may be such that the first reflection 902 corresponding to the open output terminals 110 of the reflectometer 102 is contained in the samples and that the number of samples of both selections match. In cases where the number of samples don't match, data extrapolation and/or zero-padding may be utilized.

In this way, the first reflection 1002, which does not represent properties of the cable or transmission line 104 (instead representing properties of the system 100 or output terminals 110) is excluded from the determination of the insertion loss of the cable or transmission line 104.

Where return loss is being determined based on echo responses obtained whilst the second end of the cable is terminated with a load or device such as receiver or transceiver, the predetermined set of samples is all the samples in the response that relate to the properties of the full length of the cable, including the reflection caused by the impedance mismatch between the second end of the cable or transmission line and the terminating device or load.

Where return loss is being determined based on echo responses obtained whilst the second end of the cable or transmission line is decoupled, open-circuited or open-terminated (i.e. when using the same echo responses used to determine insertion loss to also calculate return loss), the predetermined set of samples is all of the samples in the echo response except the samples 1006 that include the second reflection 1004.

Selecting a pre-determined set of samples may result in the samples not starting and ending at the same amplitude. In the echo response of FIG. 10*a*, the amplitude at the start and end of the second echo response is approximately centred at 0. If the predetermined set of samples are chosen such that there is a difference in amplitude between the start and end of the predetermined set of samples, spectral leakage may occur, reducing the accuracy of the characteristic determination. So as to reduce the spectral leakage, traditional windowing may be applied to the sample selection. However, instead, polynomial functions may be used to extrapolate data points before and after the selected samples to ensure that the selected samples start and end at approximately the same amplitude.

For example, where the sample window is chosen to be between sample S3 and S4 of FIG. 10*a*, there is a difference in amplitude between the samples. Sample S3 represents the first sample of the sample window and sample S4 represents the final sample of the sample window. In the fast Fourier process, the samples in the sample window are, essentially, repeated—as such having a difference in amplitude results in an amplitude jump/rapid change.

Figure 10B:
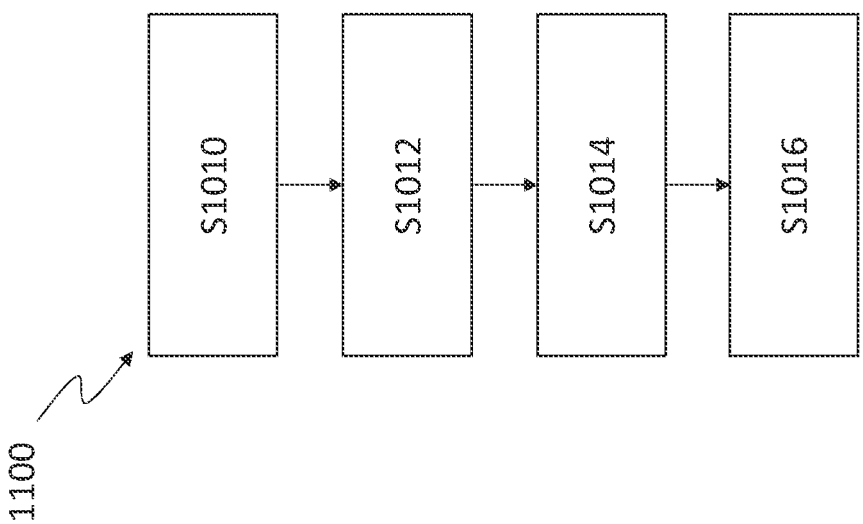
FIG. 10*b* is a flowchart of a method for reducing spectral leakage by fitting a polynomial to at least one of the start or end of the sample window.

FIG. 10*b* is a flowchart of a method for reducing the spectral leakage by fitting a polynomial to at least one of the start or end of the sample window such that the start and end of the sample window have substantially the same amplitude.

At step S1010, the amplitude of a first sample (S3) within the predetermined set of samples within the second echo response is determined.

At step S1012, the amplitude of a final sample (S4) within the predetermined set of samples within the second echo response is determined.

At step S1014 a difference between the amplitude of the first sample and the amplitude of the final sample is determined.

At step S1016, a polynomial function is determined and added to at least one of a start and an end of the predetermined set of samples within the second echo response so that the first sample and the final sample have the same amplitude. In this way, spectral leakage is reduced or removed.

Figure 10C:
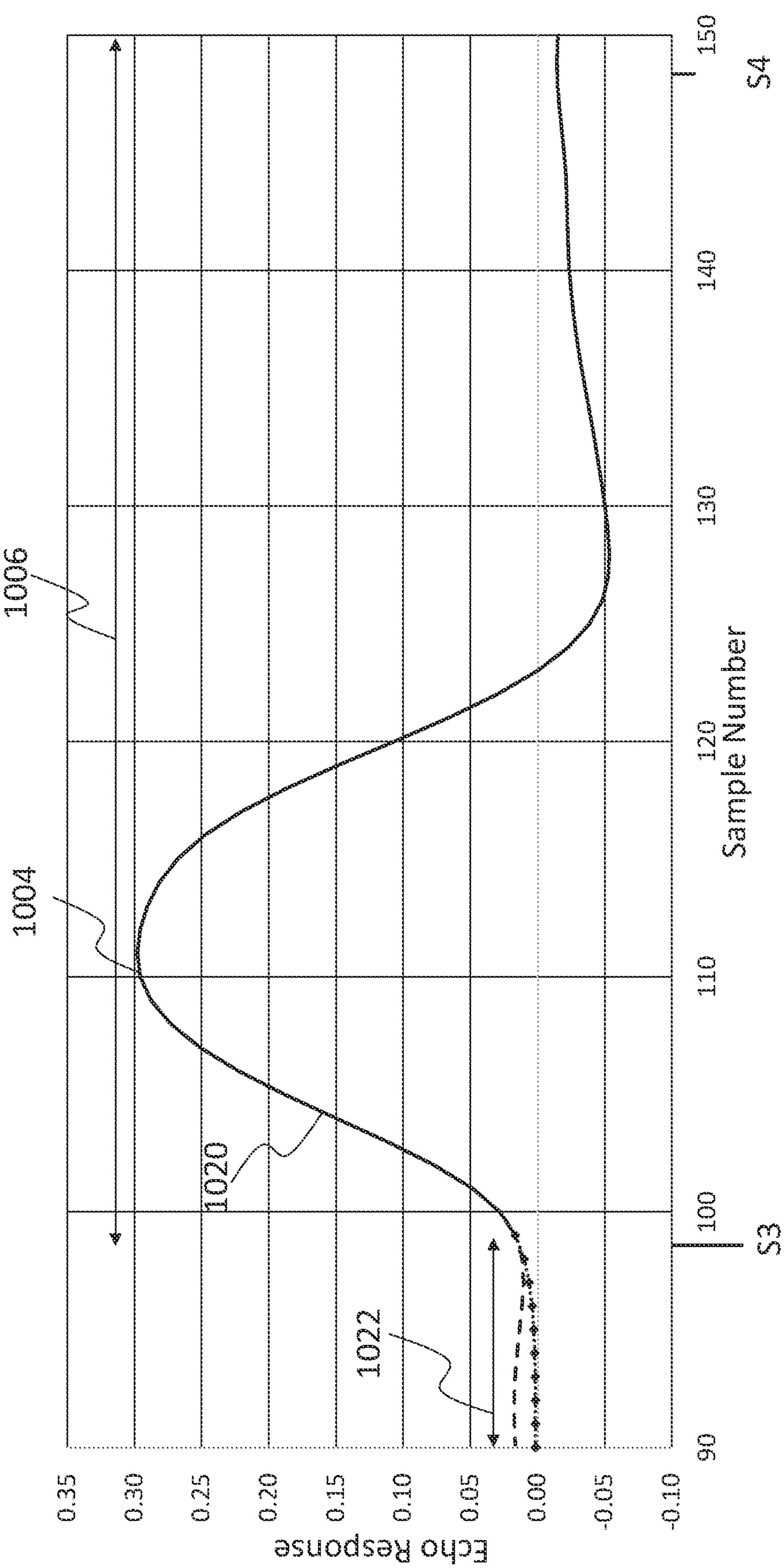
FIG. 10*c* is a graph of an echo response with selected samples and a polynomial fitting.
Figure 10D:
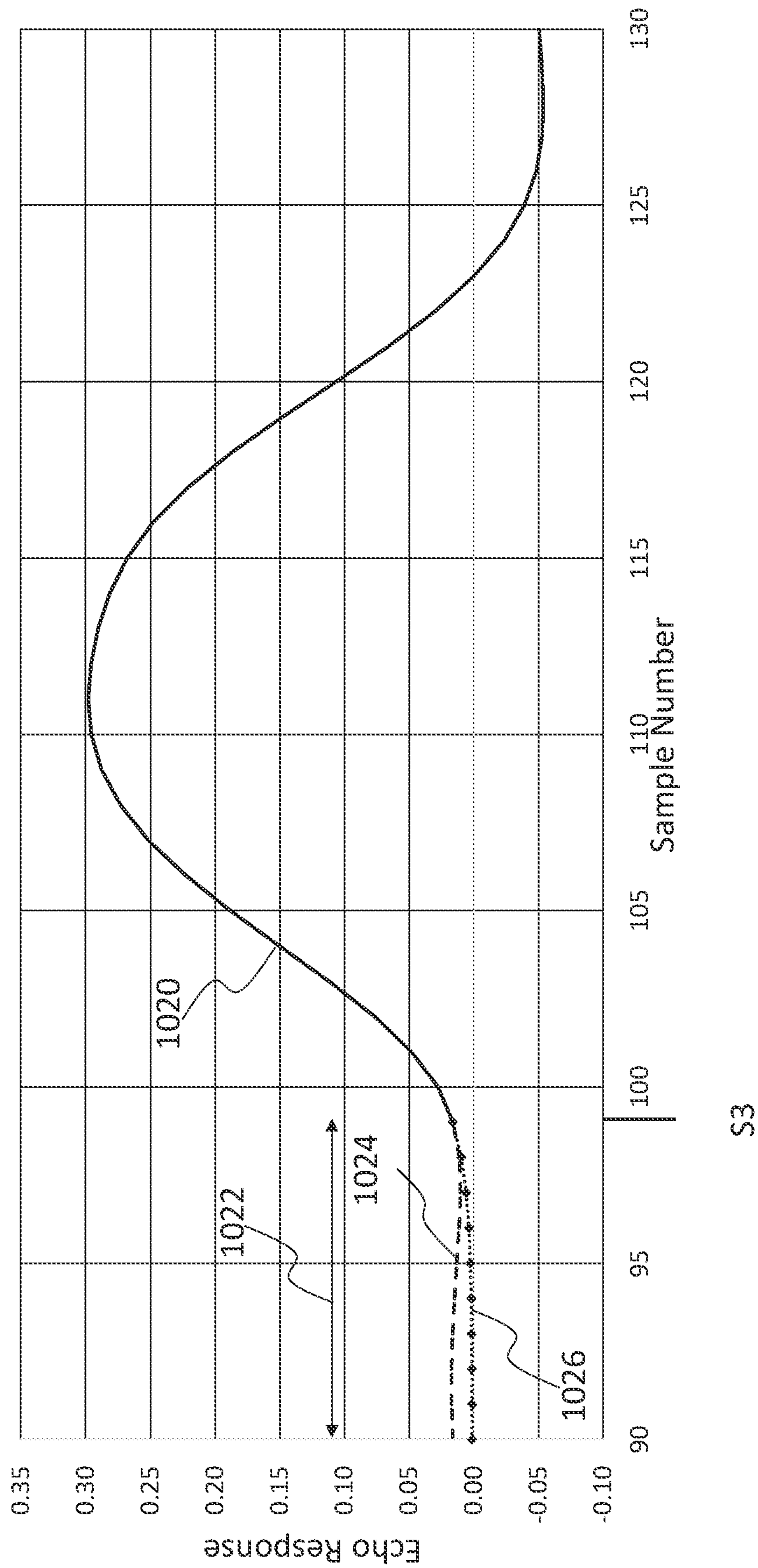
FIG. 10*d* is a subsection of the graph of FIG. 10*c;*

FIGS. 10*c* and 10*d* show an echo response with selected samples 1006 and the polynomial fitting process of FIG. 10*b*. The echo response shown in FIG. 10C includes a predetermined set of samples between sample number S3 and sample number S4 1006. The predetermined or selected set of samples is displayed as the solid line of samples 1020 in FIG. 10*c*. The amplitude of the echo response at sample S3 is not zero. The amplitude of the echo response at sample S4 is below zero. As such, polynomial fitting may be applied to the side of the predetermined set of samples 1006 with a non-zero amplitude. Polynomial fitting is not required at the sample S4 at the other end of the predetermined set of samples, if the amplitude is zero. Where both sample S3 and S4 are non-zero, polynomial fitting may be applied to both the start and end of the predetermined sample window 1006.

The samples in the range 1022 of FIG. 10*c* show how the polynomial fitting may be applied. FIG. 10*d* shows a subsection of the same echo response as FIG. 10*c*, providing a more detailed view of the polynomial fitting. The polynomial fitting may be applied over the data points or over the slope of the data points.

The dashed line 1024 shows the samples of the echo response. As can be seen, these diverge from zero. As such, a set of extrapolated samples 1026 is determined from the first sample S3 of the set of pre-selected samples 1006. The extrapolated samples 1026 buffer the predetermined set of samples 1006 ensuring that the pre-determined set of samples end at zero.

Return Loss Determination with Alternative Echo Responses

The first and second echo responses obtained in steps S802 and S806 of FIG. 8, which are used to determine the insertion loss, may also be used to additionally or alternatively determine the return loss of the cable or transmission line using a sampling method similar to that described with respect to FIG. 10*b*.

Re-using the first echo response obtained whilst the time domain reflectometer 102 is decoupled from the cable or transmission line 104 and the second echo response obtained whilst the second end of the cable or transmission line 104 is open-circuited or decoupled reduces the number of echo responses that need to be obtained. It further allows the return loss to be determined whilst the second end of the cable or transmission line 104 is open-circuited or decoupled rather than terminated (as described with respect to FIG. 5). Where a cable is pre-installed or historic, the second end of the cable or transmission line may be inaccessible. Being able to determine the return loss no matter the type of coupling applied to the second end of the cable or transmission line 104 allows a technician or field engineer to easily characterise the cable.

Figure 8C:
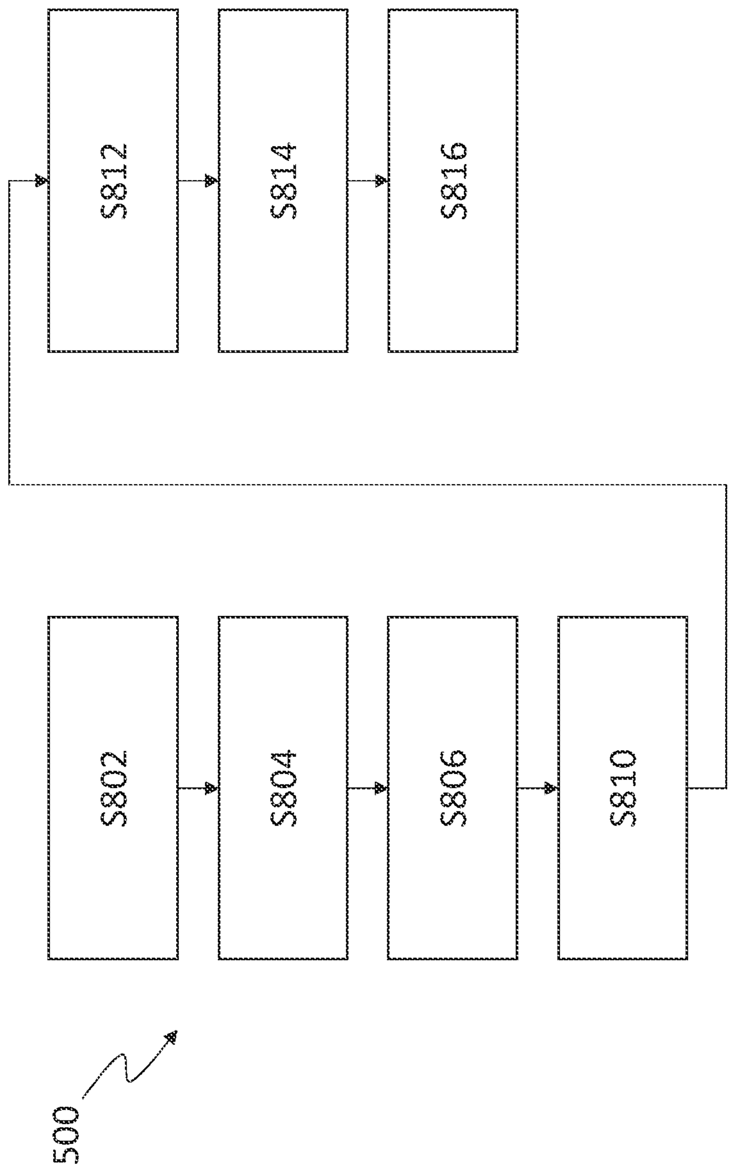
FIG. 8*c* shows a flowchart of a method for determining a return loss of a cable or transmission line using alternative echo responses.

FIG. 8*c* shows how the return loss of the cable or transmission line may be determined. Steps S802-S806 are the same as described with respect to FIG. 8*a*. After the second echo response is obtained, the method proceeds to step S810.

At step S810, the method comprises determining the presence of reflection in the second echo response caused by the second end of the cable or transmission line being open-circuited. This is shown in FIG. 10*a* as the second reflection 1004.

At step S812, the method comprises selecting a predetermined set of samples within the second echo response that do not include the reflection caused by the open-circuit at the end of the cable or transmission line 104. For example, a predetermined set of samples or sample window 1008 as shown in FIG. 10*a* may be selected. A corresponding predetermined set of samples within the first echo response are selected (i.e. samples with the same sample number).

At step S814, the method comprises determining a ratio of a fast Fourier transform of the predetermined set of samples within the first echo response to a fast Fourier transform of the predetermined set of samples within the second echo response.

In a number of the described methods, a fast Fourier transform of the echo responses are taken. So as to reduce the computational processing required for the fast Fourier transform, the number of samples used may be a power of two. Alternatively, the echo responses or selected samples may be padded with zeros such that the number of samples is a power of two.

At step S816, the method comprises determining a ratio of a fast Fourier transform of the predetermined set of samples within the first echo response to a fast Fourier transform of the predetermined set of samples within the second echo response to determine the return loss of the cable or transmission line.

$$RL = 20 * \log_{10} \frac{FFT(\text{Selected Samples of First Echo response})}{FFT(\text{Selected Samples of Second Echo Response})}$$

Bi-Directional TDR for Insertion Loss Determination:

As shown in FIG. 3, a second time domain reflectometer 310 may be coupled to the second end of the cable or transmission line. The second time domain reflectometer 310 may form part of a communication system or transceiver and be permanently coupled to the cable or transmission line. Alternatively, the time domain reflectometer may be decoupled from the first end of the cable or transmission line and coupled to the second end of the cable or transmission line.

Rather than determining the insertion loss of the cable or transmission line using echo responses of the time domain reflectometer coupled to the first end of the cable or transmission line 104, the insertion loss may instead be determined using echo responses obtained from opposite ends or both ends of the cable or transmission line 104.

Figure 11:
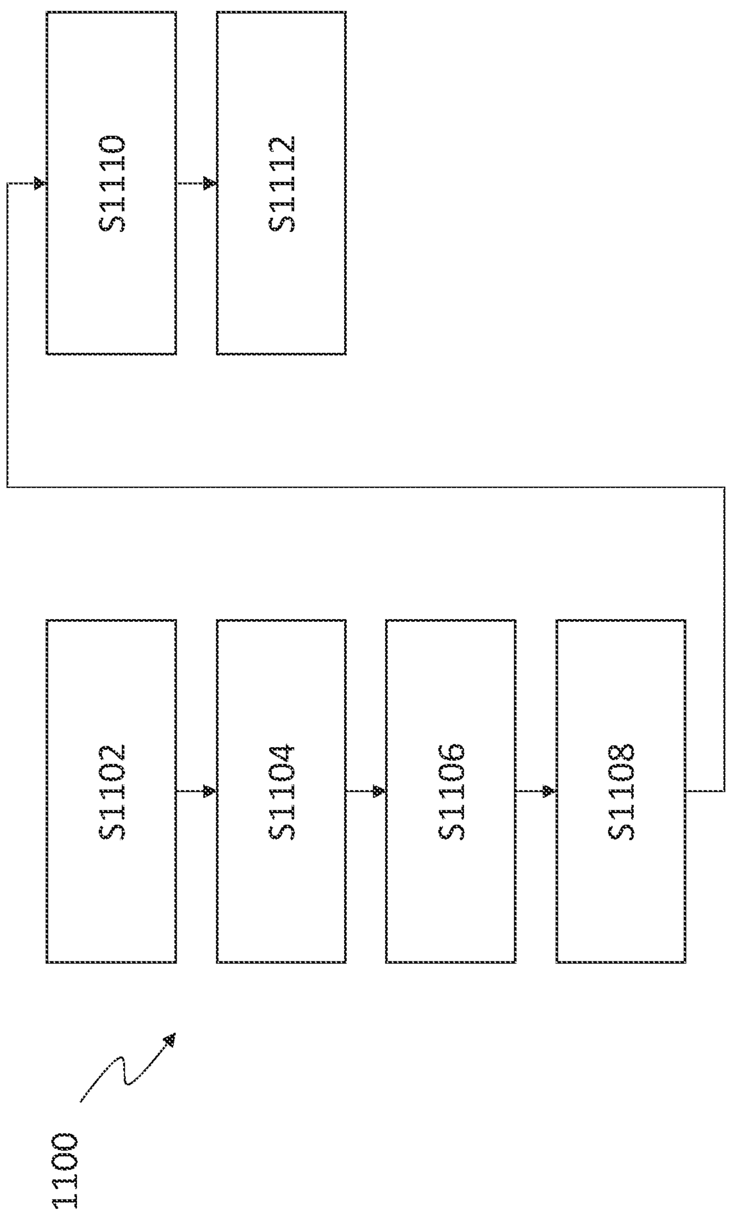
FIG. 11 is a flowchart of a method for determining an insertion loss of the cable or transmission line.

FIG. 11 is a flowchart of a method for determining an insertion loss of the cable or transmission line 104.

At step S1102, a first echo response is acquired using time domain reflectometry. The first echo response is obtained from a first end of the cable or transmission line 104 whilst the time domain reflectometer 102 is connected to a first end of a cable or transmission line 104 and the second end of the cable or transmission line 104 is connected to the reflectometer 310. As such, the end of the cable may be terminated by the termination impedance of the reflectometer 310. The first echo response may be acquired while the normal data traffic or communication is not interrupted by using the echo canceller coefficients of the transceiver in which the reflectometer 100 is part of.

At step S1104, a second echo response is acquired using time domain reflectometry. The second echo response is obtained from a second end of the cable or transmission line 104 whilst the time domain reflectometer 310 is connected to a second end of a cable or transmission line 104 and the first end of the cable or transmission line 104 is connected to the reflectometer 102. As such, the first end of the cable 104 may be terminated by the termination impedance of the reflectometer 100. The second echo response may be acquired while the normal data traffic is not interrupted by using the echo canceller coefficients of the transceiver in which the reflectometer 310 is part of.

At step S1106, a first reflection is identified in the first echo response. The first reflection corresponding to the impedance mismatch between the output impedance of the reflectometer 102 and the cable or transmission line 104.

At step S1108, as second reflection is identified in the second echo response. This second reflection being the last valid reflection in the second echo response and located at a time corresponding to the length of the cable. As such, the second reflection corresponds to the impedance mismatch between the cable or transmission line 104 and the impedance of the first time domain reflectometer 102.

As such, the first reflection in the first echo response and the second reflection in the second echo response relate to the same impedance mismatch, however, the second reflection is also affected by the insertion loss of the cable, as it is from the end of the cable with respect to the measuring point.

At step S1110, a ratio of a fast Fourier transform of the first complete reflection within the first echo response to a fast Fourier transform of the second complete reflection within the second echo response.

$$IL = 20 * \frac{1}{2} * \log_{10}\frac{FFT(\text{First Complete Reflection in first Echo Response})}{FFT(\text{Second Complete Reflection in second Echo Response})}$$

At step S1112 a logarithm of the ratio may be obtained to determine the insertion loss of the cable in decibels.

As well as or alternatively to using the first and second echo responses to determine an insertion loss, a third complete reflection may be identified in the first echo response, the third complete reflection corresponding to an impedance mismatch between the cable or transmission line and the second time domain reflectometer coupled at the second end of the cable or transmission line. A ratio of a fast Fourier transform of the first complete reflection within the first echo response to a fast Fourier transform of the third complete reflection within the first echo response provides a value indicative of the insertion loss. A logarithm may be used to determine the logarithm in decibels. In this way, the insertion loss may be determined based solely on a single echo response.

$$IL = 20 * \frac{1}{2} * \log_{10}\frac{FFT(\text{First Complete Reflection in First Echo Response})}{FFT(\text{Third Complete Reflection in First Echo Response})}$$

Transceiver Properties

The time domain reflectometer 102 may be a dedicated time domain reflectometer. It may alternatively form part of a transceiver, transmitter, receiver or communication system. As such, the previously described echo responses may be obtained using a transceiver, and in particular may be obtained used using the echo-canceller coefficients of the transceiver. Echo canceller coefficients are the coefficients applied to a filter typically used in a transceiver, transmitter or receiver to cancel reflections that are present along the transmission line. This allows improved communication with reduced noise. The filter and echo-canceller coefficients applied to the filter may be utilised to act as a time-domain reflectometer in the system without disrupting the data communication performed by the system. This allows determination of cable or transmission line characteristics in the background whilst communication is taking place.

Using the echo-canceller coefficients may allow the transceiver to obtain the echo response of the cable or transmission line whilst the transceiver is operating to provide data communication with a transceiver or receiver coupled to the second end of the cable or transmission line 104. This allows periodic or regular updates to the determination of cable or transmission line characteristics in the background whilst the system is operating.

Further, where the method includes echo responses obtained from the first end and the second end of the cable or transmission line (as described with respect to FIG. 11), the echo responses may be obtained by respective transceivers. For example, an echo response may be obtained using the echo-canceller coefficients of a first transceiver coupled to the first end of the cable or transmission line whilst the first transceiver is operating to provide data communication. A further echo response may be obtained using the echo-canceller coefficients of a second transceiver coupled to the second end of the cable or transmission line whilst the second transceiver is operating to provide data communication with the first transceiver.

Impact of Characteristic Determination on a Communication System

Once the respective characteristic (return loss, impedance, or insertion loss) of a cable or transmission line 104 has been determined it may be used to track characteristics of the cable.

Communication systems typically operate in accordance with a technical standard or communication standard. For example, the IEEE802.3cg 10BASE-T1L specifications outline a set of requirements for communications systems for ethernet data over single pair of wires. These requirements relate to the communication system transceiver and to the cable or transmission line 104 used with the transceiver. The requirements may include bounds or ranges in which certain characteristics of the cable or transmission line 104 must fall to be compatible with the technical standard. Once the characteristic of the cable or transmission line 104 has been determined using time domain reflectometry, it may be compared to a specified range for that characteristic within the technical standard.

If the cable or transmission line 104 is determined to have suitable characteristics that comply with the technical standard, communication according to that standard may be performed using that cable or transmission line. If the cable or transmission line 104 is determined to have non-suitable characteristics that do not comply with the technical standard, a replacement cable may be installed. This allows historic cables already installed in a building to be reused if they are suitable for use with the technical standard.

The characteristics of the cable or transmission line may be tracked over time to determine possible degradation of the cable characteristics.

Figure 12:
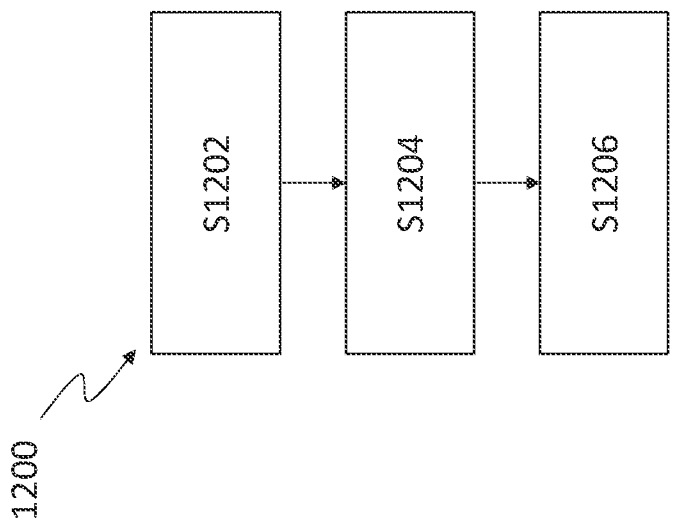
FIG. 12 is a flowchart of a method for tracking cable degradation by monitoring the cable or transmission line 104 characteristics over time.

FIG. 12 is a flowchart outlining a method 1200 for tracking cable degradation by monitoring the cable or transmission line 104 characteristics over time. The method may be performed by the control system 106 of the system 100. Alternatively, the method may be performed by a separate control system that is not couped to the cable, but that receives the echo response from the time-domain reflectometer 102. A second characteristics of the cable or transmission line of the same type as the first characteristic (e.g. impedance, insertion loss, return loss) may be determined at a second time later than the first characteristic is determined. Degradation of the cable or transmission line may then be determined by comparing the second characteristic of the cable or transmission line to the first characteristic of the cable or transmission line.

The method 1200 may be performed following any of the methods 400, 500 or 800.

At step S1202, a third echo response may be obtained using time domain reflectometry. The third echo response is obtained whilst the time domain reflectometer 102 is coupled to the cable or transmission line 104. The second end of the cable or transmission line may be terminated using the load or communication system 310 when the characteristic is an impedance or return loss of the cable or transmission line 104 (when the method 1100 follows method 500) or open-circuited when the characteristic is an insertion loss (when the method 1100 follows method 800).

At step S1204 a second characteristic of the cable or transmission line is determined by comparing the third echo response obtained in step S1102 to the first echo response obtained in step S502 or step S802. The second characteristic is the same type of characteristic as the earlier characteristic determined in methods 500 or 800, but relates to the characteristic at a different time compared to the earlier characteristic. Whilst only a third echo response is obtained in the method 1200, instead a third echo response corresponding to the first echo response and a fourth echo response corresponding (i.e. acquired in the same manner) to the second echo response may be obtained. As such, the second characteristic of the cable or transmission line 104 may be determined by comparing the fourth echo response and third echo response. In this way, the echo response relating to the time domain reflectometer is updated, rather than reused.

At step S1206, the method 1200 comprises determining degradation of the cable or transmission line 104 characteristics by comparing the second characteristic of the cable or transmission line to the characteristic of the cable or transmission line. Determining degradation of the cable may comprise determining whether the characteristic of the cable or transmission line 104 falls within an acceptable value provided by a technical standard or determining whether the characteristic has changed by a certain percentage compared to the earlier determined characteristic.

The system 100 which comprises the time domain reflectometer 102 may form part of a communication system. As such, the method 1200 may be repeated regularly or periodically throughout the use of the cable or transmission line 104 in a communication system. This allows the communication system to determine whether the cable has degraded to such an extent that communication is no longer possible, or a certain quality of service can no longer be provided.

Following determination of a characteristic of the cable, the method may further comprise determining a maximum possible length of the cable or transmission line that can be supported by a communication system 100 in dependence on the determined characteristic of the cable or transmission line 104. For example, a section of cable or transmission line 104 with a first length X may be coupled to the time domain reflectometer and a characteristic of the cable or transmission line 104 determined. From this, the maximum possible length of cable or transmission line 104 with that characteristic may be determined by extrapolation of the characteristic to different cable lengths and comparison with a technical standard.

Where the determined characteristic of the cable or transmission line 104 is an impedance of the cable or transmission line 104, the output impedance of the transceiver or system 100 may be modified to match the determined impedance of the cable or transmission line.

Figure 13:
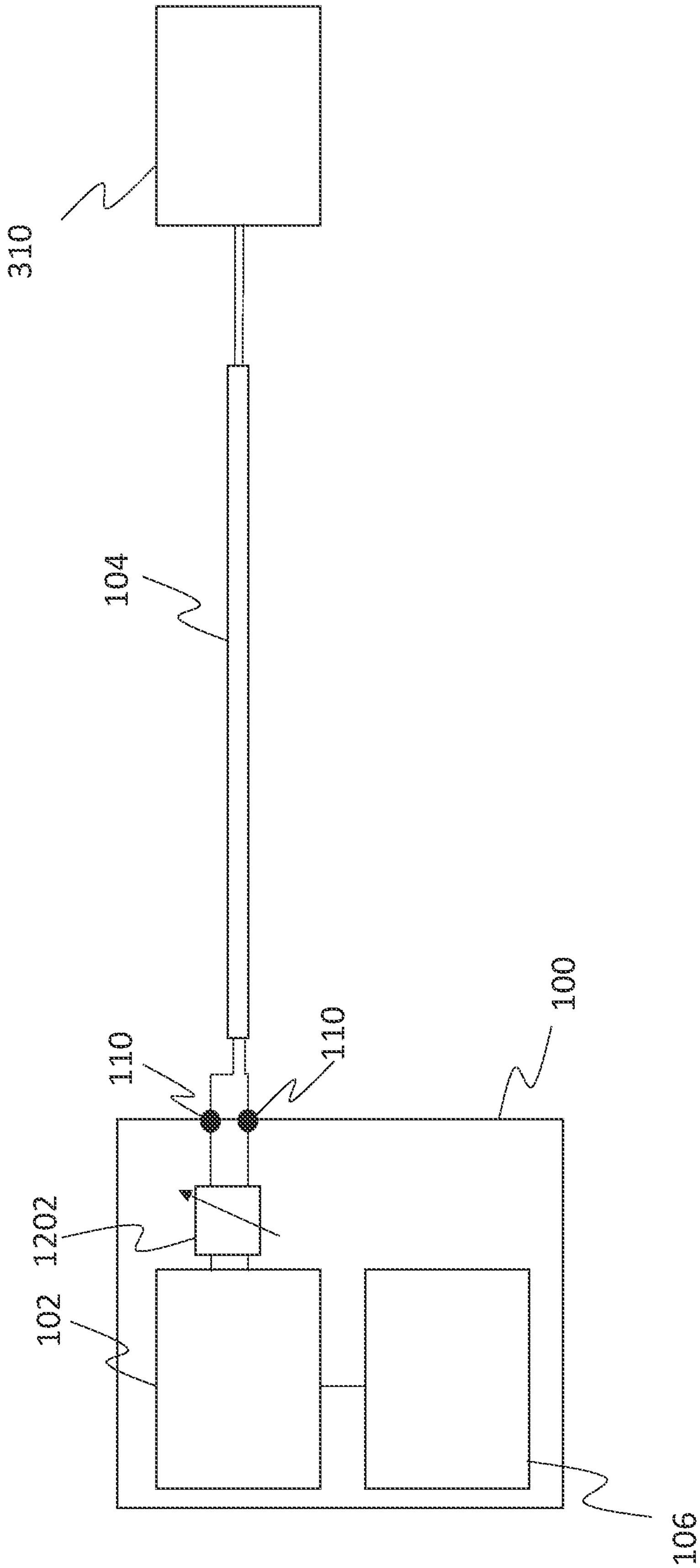
FIG. 13 is a schematic representation of a time domain reflectometry system including a trimmable output impedance.

FIG. 13 shows the system 100, which may be a time domain reflectometer 102 or communication system 100 comprising a time domain reflectometer 102. The system 100 comprises a trimmable or controllable output impedance 1202. The controllable output impedance of the transceiver coupled to the first end of the cable or transmission line 104 may be modified to match the determined impedance of the cable or transmission line. This provides better matching between the communication system 100 and the cable or transmission line.

Further, where the impedance is periodically or regularly determined using method 1100, the output impedance of the system 100 may be updated to match any changes in the impedance of the cable or transmission line 104.

This reduces the degradation of the communication link quality, allowing the communication system 100 to provide a high quality of service even as the cable or transmission line degrades or ages. This extends the life of the cable or transmission line without the need for manual checks of cable characteristics using vector analysers.

The time domain reflectometer 102 or transceiver comprising the time domain reflectometer 102 provides a communication signal or sequence of transmission symbols with a certain output power. The output power of the transceiver may change over time. This may be tracked or characterised by determining a fast Fourier transform of the first echo response obtained whilst the output terminals of 110 of the time domain reflectometer are open-circuited or decoupled. The output power may be determined at multiple times by obtaining new echo responses whilst the time domain reflectometer or transceiver are open-circuited. Where the time domain reflectometer is part of a transceiver, the power of the output communication signal may be adapted to ensure it is of a suitable level, for example according to a technical or communication standard, in dependence on the determined output power.

Whilst the determination of the return loss of the cable or transmission line is outlined above, the return loss of the time domain reflectometer 102 or transceiver itself may also be determined using a corresponding method with the echo responses acquired whilst no cable or transmission line is coupled to the reflectometer. This allows the effects of the transceiver to be taken into account when setting up a communication link. The output power, return loss, insertion loss and impedance of the reflectometer or transceiver may be repeatedly or periodically obtained and compared to one another to monitor changes in the properties of the reflectometer or transceiver over time.

Figure 14:
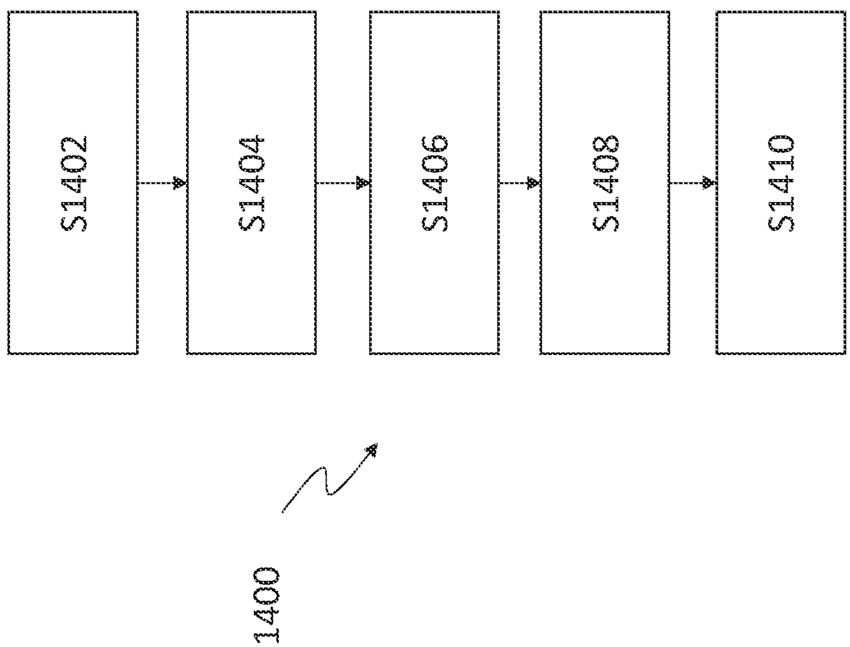
FIG. 14 is a flowchart of a method of determining the return loss of the time domain reflectometer or transceiver comprising the time domain reflectometer.

FIG. 14 is a flowchart of a method of determining the return loss of the time domain reflectometer 102 or transceiver comprising the time domain reflectometer.

At step S1402, a first echo response is obtained using time domain reflectometry, whilst the time domain reflectometer 102 is not coupled to the cable or transmission line 104, as shown in FIG. 1. As such, the first echo response represents an echo response of open output terminals of the time domain reflectometer 102 or the system 100 within which the time domain reflectometer 102 is part. This provides an echo response including information relating to the system 100.

At step S1404, the method comprises terminating the output terminals 110 of the time domain reflectometer using an impedance matched to the nominal impedance of the time domain reflectometer.

At step S1406, the method comprises obtaining a second echo response whilst the output terminals of the time domain reflectometer are coupled to a matched impedance.

At step S1408, a ratio of a fast Fourier transform of the first echo response to a fast Fourier transform of the second echo response is obtained to determine a reflection coefficient of the time domain reflectometer 102.

At step S1410, a logarithm of the ratio is obtained to determine the return loss of the cable or transmission line in decibels.

The systems previously described include one or two time domain reflectometers coupled to a single cable or transmission line. Larger networks may include a plurality of transceivers (for example, 2, 4, 6, 8, 10 or more transceivers) coupled at different points of a large number of cables or transmission lines, distributed throughout the network. The network may also include transceivers which act as repeaters at certain points of the network. As they form part of a communications system or network, the transceivers may communicate with one another. As such, on the command of a primary or main controller, the distributed transceivers may perform echo responses of the respective cables or transmission lines that they are connected or coupled to. The echo responses may be used locally at each transceiver to determine characteristics of the cable according to the previously described methods and transmitted to the primary transceiver. Alternatively, the echo responses may be transmitted to the primary transceiver which may then determine the characteristics centrally. A map of the network containing all the transceivers and cables or transmission lines may then be generated and periodically updated to track degradation and aging in different parts of the network.

Where the description outlines a method in which an echo response is obtained with an open-circuit connection (either an open connection at the terminals of the time domain reflectometer when no cable or transmission line is coupled to the reflectometer, or an open connection at the second end of the cable or transmission line when a cable or transmission line is coupled to the reflectometer) an echo response acquired with a short at the terminals or at the second end of the cable or transmission line may be used instead. The previously described equations do not change in this situation. Further, a mix or selection of open and short connections may be used.

Various modifications whether by way of addition, deletion, or substitution of features may be made to the above described examples to provide further examples, any and all of which are intended to be encompassed by the appended claims.

ASPECTS OF THE DISCLOSURE

Included below are a set of numbered aspects according to the disclosure:

1. A method for characterising a cable or transmission line, the method comprising:
   obtaining a first echo response using time domain reflectometry;
   coupling a first end of the cable or transmission line to a time domain reflectometer;
   obtaining a second echo response using time domain reflectometry;
   determining a characteristic of the cable or transmission line by comparing the first echo response and the second echo response.
2. The method according to aspect 1, wherein obtaining the first echo response comprises obtaining an echo response of a time domain reflectometer.
3. The method according to aspect 2, wherein obtaining the first echo response comprises obtaining the first echo response whilst output terminals of the time domain reflectometer are open-circuited or short-circuited.
4. The method according to any preceding aspect, wherein obtaining the second echo response comprises obtaining an echo response of the time domain reflectometer and the cable or transmission line.
5. The method according to any preceding aspect, wherein the method further comprises terminating the second end of the cable or transmission line using a load.
6. The method according to aspect 5, wherein terminating the second end of the cable or transmission line using a load comprises either:
   terminating the second end of the cable or transmission line using a receiver or transceiver used for communication;
   terminating the second end of the cable or transmission line using an impedance matched to an impedance of the cable or transmission line.
7. The method according to any preceding aspect, wherein the method further comprises obtaining the second echo response whilst the second end of the cable or transmission line is terminated using a load.
8. The method according to any of aspects 4-7, wherein the characteristic of the cable or transmission line comprises a return loss of the cable or transmission line, and wherein determining the return loss comprises:
   determining a ratio of a fast Fourier transform of the first echo response to a fast Fourier transform of the second echo response to determine a reflection coefficient of the cable or transmission line.
9. The method according to aspect 8, wherein determining the return loss further comprises:
   taking a logarithm of the ratio to determine the return loss of the cable in decibels.
10. The method according to any of aspects 8 or 9, wherein the characteristic of the cable or transmission line comprises an impedance of the cable or transmission line, and wherein determining the impedance of the cable or transmission line comprises:
    determining a ratio of the reflection coefficient of the cable or transmission line.
11. The method according to aspect 10, further comprising:
    modifying an output impedance of the time domain reflectometer coupled to the first end of the cable or transmission line to match the determined impedance of the cable or transmission line.

12. The method according to any of aspects 5-7, further comprising:

terminating the first output terminal and second output terminal of the time domain reflectometer using an impedance matched to an impedance of the time domain reflectometer;

obtaining a third echo response;

subtracting a fast Fourier transform of the third echo response from a fast Fourier transform of the second echo response to obtain the relative frequency response of the cable or transmission line;

determining a ratio of a fast Fourier transform of the first echo response to the relative frequency response of the cable or transmission line to determine a reflection coefficient of the cable or transmission line;

taking a logarithm of the ratio to determine the return loss of the cable in decibels.

13. The method according to aspect 1, wherein the method further comprises decoupling a load from a second end of the cable or transmission line.

14. The method according to aspect 1 or aspect 13, wherein the method further comprises obtaining the second echo response whilst the second end of the transmission line is open-circuited.

15. The method according to aspect 13 or 14, wherein the characteristic of the cable or transmission line comprises an insertion loss of the cable or transmission line, and wherein determining the insertion loss comprises:

determining a ratio of a fast Fourier transform of the first echo response to a fast Fourier transform of the second echo response to determine the insertion loss of the cable or transmission line.

16. The method according to aspect 15, wherein determining the insertion loss in decibels comprises taking a logarithm of the ratio and multiplying the logarithm by ½.

17. The method according to any preceding aspect, further comprising:

selecting a predetermined set of samples within the second echo response and a corresponding predetermined set of samples within the first echo response for comparison.

18. The method according to aspect 17, further comprising:

determining the presence of a first reflection and a second reflection in the second echo response;

selecting the predetermined set of samples such that they include the second reflection and do not include the first reflection.

19. The method according to aspect 18, further comprising:

determining the amplitude of a first sample within the predetermined set of samples within the second echo response;

determining the amplitude of a final sample within the predetermined set of samples within the second echo response;

determining a difference between the amplitude of the first sample and the amplitude of the final sample;

fitting a polynomial function to at least one of a start and an end of the predetermined set of samples within the second echo response so that the first sample and the final sample have the same amplitude.

20. The method according to any of aspects 14-16, further comprising:

determining the presence of a first reflection in the second echo response caused by the second end of the cable or transmission line being open-circuited;

selecting a predetermined set of samples within the second echo response which do not include the first reflection and a corresponding predetermined set of samples within the first echo response for comparison;

determining a ratio of a fast Fourier transform of the predetermined set of samples within the first echo response to a fast Fourier transform of the predetermined set of samples within the second echo response;

taking a logarithm of the ratio to determine the return loss of the cable in decibels.

21. The method according to any preceding aspect, wherein the time domain reflectometer is a transceiver, and wherein the first and second echo responses are obtained using the echo-canceller coefficients of the transceiver.

22. The method according to aspect 21, wherein the second echo response is obtained using the echo-canceller coefficients of the transceiver whilst the transceiver is operating to provide data communication.

23. The method according to aspect 21, wherein the second echo response is obtained using the echo-canceller coefficients of a first transceiver coupled to the first end of the cable or transmission line whilst the first transceiver is operating to provide data communication and wherein the third echo response is obtained using the echo-canceller coefficients of a second transceiver coupled to the second end of the cable or transmission line whilst the second transceiver is operating to provide data communication with the first transceiver.

24. The method according to any preceding aspect, further comprising:

comparing the determined characteristic of the cable or transmission line to a cable standard or communications standard comprising cable definitions;

determining whether the cable or transmission line is compliant with the cable standard or communications standard.

25. The method according to any preceding aspect, further comprising:

determining a second characteristic of the cable or transmission line;

determining degradation of the cable characteristics by comparing the second characteristic of the cable or transmission line to the characteristic of the cable or transmission line.

26. The method according to any preceding aspect, further comprising:

determining a maximum possible length of the cable or transmission line that can be supported by a communication system in dependence on the determined characteristic of the cable or transmission line by extrapolating determined characteristic of the cable or transmission line and comparing the extrapolation to a limit curve.

27. The method according to any preceding aspect, further comprising:

determining an output power of a transceiver or reflectometer by determining a fast Fourier transform of the first echo response.

28. The method according to any of aspects 1-4, further comprising:
  terminating the time domain reflectometer using an impedance matched to an impedance of the time domain reflectometer;
  obtaining a third echo response;
  determining a ratio of a fast Fourier transform of the first echo response to a fast Fourier transform of the third echo response to determine a reflection coefficient of the time domain reflectometer;
  taking a logarithm of the ratio to determine the return loss in decibels.
29. The method according to any preceding aspect, wherein obtaining the first echo response and obtaining the second echo response comprises transmitting a pseudo random sequence of transmission symbols or other signal with a power spectral density containing the frequency range of interest for a given communication standard or transceiver specification.
30. A method for characterising a cable or transmission line, the method comprising:
  obtaining a first echo response using time domain reflectometry from a first end of a cable or transmission line using a first time domain reflectometer whilst a second end of the cable is coupled to a second time domain reflectometer;
  obtaining a second echo response using time domain reflectometry from the second end of the cable or transmission line whilst the first end of the cable or transmission line is coupled to the first time domain reflectometer;
  identifying a first complete reflection in the first echo response, the first reflection corresponding to an impedance mismatch between the first time domain reflectometer and the cable or transmission line;
  identifying a second complete reflection in the second echo response, the second complete reflection corresponding to an impedance mismatch between the cable or transmission line and the first time domain reflectometer coupled at the first end of the cable;
  determining a ratio of a fast Fourier transform of the first complete reflection within the first echo response to a fast Fourier transform of the second complete reflection within the second echo response;
  taking a logarithm of the ratio and multiplying by ½ to determine the insertion loss of the cable or transmission line in decibels.
31. The method according to aspect 30, further comprising:
  identifying a third complete reflection in the first echo response, the third complete reflection corresponding to an impedance mismatch between the cable or transmission line and the second reflectometer coupled at the second end of the cable or transmission line;
  determining a ratio of a fast Fourier transform of the first complete reflection within the first echo response to a fast Fourier transform of the third complete reflection within the first echo response;
  taking a logarithm of the ratio and multiplying by ½ to determine the insertion loss of the cable or transmission line in decibels.
32. A method for characterising a cable or transmission line, the method comprising:
  obtaining a first echo response of a time domain reflectometer using time domain reflectometry;
  coupling a first end of the cable or transmission line to a time domain reflectometer;
  obtaining a second echo response of the cable or transmission line using time domain reflectometry;
  determining a return loss of the cable or transmission line by comparing the first echo response and the second echo response.
33. A method of characterising a time domain reflectometer, the method comprising:
  obtaining a first echo response of the time domain reflectometer;
  terminating an output terminal of the time domain reflectometer;
  obtaining a second echo response of the time domain reflectometer;
  determining a characteristic of the time domain reflectometer by determining a ratio of a fast Fourier transform of the first echo response to a fast Fourier transform of the second echo response.
34. The method of characterising the time domain reflectometer according to aspect 33, the method further comprising:
  determining a change in a property of the time domain reflectometer by monitoring a change in the characteristic over time.

The invention claimed is:

1. A method for characterising a cable or transmission line, the method comprising:
  obtaining a first echo response using time domain reflectometry;
  coupling a first end of the cable or transmission line to a time domain reflectometer and terminating a second end of the cable or transmission line using a load;
  obtaining a second echo response using time domain reflectometry; and
  determining a characteristic of the cable or transmission line by comparing the first echo response and the second echo response, wherein the characteristic of the cable or transmission line comprises a return loss of the cable or transmission line, and wherein determining the return loss comprises:
  determining a ratio of a fast Fourier transform of the first echo response to a fast Fourier transform of the second echo response to determine a reflection coefficient of the cable or transmission line.

2. The method according to claim 1, wherein obtaining the first echo response comprises obtaining the first echo response whilst a first output terminal and second output terminal of the time domain reflectometer are at least one of open-circuited or short-circuited.

3. The method according to claim 1, wherein terminating the second end of the cable or transmission line using a load comprises either:
  terminating the second end of the cable or transmission line using a receiver or transceiver used for communication; and
  terminating the second end of the cable or transmission line using an impedance matched to an impedance of the cable or transmission line.

4. The method according to claim 1, further comprising:
  terminating a first output terminal and second output terminal of the time domain reflectometer using an impedance matched to an impedance of the time domain reflectometer;
  obtaining a third echo response;
  subtracting a fast Fourier transform of the third echo response from a fast Fourier transform of the second echo response to obtain a relative frequency response of the cable or transmission line;

determining a ratio of a fast Fourier transform of the first echo response to the relative frequency response of the cable or transmission line to determine a reflection coefficient of the cable or transmission line; and taking a logarithm of the ratio to determine a return loss of the cable or transmission line in decibels.

5. The method according to claim 1, wherein obtaining the second echo response comprises obtaining the second echo response whilst the second end of the cable or transmission line is at least one of open-circuited or short-circuited.

6. The method according to claim 5, wherein obtaining the second echo response comprises obtaining the second echo response whilst the second end of the cable or transmission line is open-circuited.

7. The method according to claim 5, wherein obtaining the second echo response comprises obtaining the second echo response whilst the second end of the cable or transmission line is short-circuited.

8. A method for characterising a cable or transmission line, the method comprising:

obtaining a first echo response using time domain reflectometry;

coupling a first end of the cable or transmission line to a time domain reflectometer and terminating a second end of the cable or transmission line using a load;

obtaining a second echo response using time domain reflectometry; and determining a characteristic of the cable or transmission line by comparing the first echo response and the second echo response, wherein the characteristic of the cable or transmission line comprises an impedance of the cable or transmission line, and wherein determining the impedance of the cable or transmission line comprises:

determining a ratio of a fast Fourier transform of the first echo response to a fast Fourier transform of the second echo response to determine a reflection coefficient of the cable or transmission line; and determining a ratio of the reflection coefficient of the cable or transmission line.

9. The method according to claim 8, further comprising:

modifying an output impedance of the time domain reflectometer coupled to the first end of the cable or transmission line to match the determined impedance of the cable or transmission line.

10. A method for characterising a cable or transmission line, the method comprising:

obtaining a first echo response using time domain reflectometry;

coupling a first end of the cable or transmission line to a time domain reflectometer;

obtaining a second echo response using time domain reflectometry while the second end of the cable or transmission line is at least one of open-circuited or short-circuited; and determining a characteristic of the cable or transmission line by comparing the first echo response and the second echo response.

11. The method according to claim 10, wherein the characteristic of the cable or transmission line comprises an insertion loss of the cable or transmission line, and wherein determining the insertion loss comprises:

determining a ratio of a fast Fourier transform of the first echo response to a fast Fourier transform of the second echo response to determine the insertion loss of the cable or transmission line.

12. The method according to claim 10, further comprising:

determining a presence of a first reflection in the second echo response caused by the second end of the cable or transmission line being at least one of open-circuited or short-circuited;

selecting a predetermined set of samples within the second echo response which do not include the first reflection and a corresponding predetermined set of samples within the first echo response for comparison;

determining a ratio of a fast Fourier transform of the predetermined set of samples within the first echo response to a fast Fourier transform of the predetermined set of samples within the second echo response; and taking a logarithm of the ratio to determine a return loss of the cable in decibels.

13. The method according to claim 10, wherein obtaining the first echo response comprises obtaining the first echo response whilst a first output terminal and second output terminal of the time domain reflectometer are at least one of open-circuited or short-circuited.

14. The method according to claim 13, wherein obtaining the first echo response comprises obtaining the first echo response whilst a first output terminal and second output terminal of the time domain reflectometer is open-circuited.

15. The method according to claim 13, wherein obtaining the first echo response comprises obtaining the first echo response whilst a first output terminal and second output terminal of the time domain reflectometer is short-circuited.

16. The method according to claim 10, wherein obtaining the second echo response comprises obtaining the second echo response whilst the second end of the cable or transmission line is open-circuited.

17. The method according to claim 10, wherein obtaining the second echo response comprises obtaining the second echo response whilst the second end of the cable or transmission line is short-circuited.

18. The method according to claim 12, comprising determining a presence of a first reflection in the second echo response caused by the second end of the cable or transmission line being open-circuited.

19. The method according to claim 12, comprising determining a presence of a first reflection in the second echo response caused by the second end of the cable or transmission line being short-circuited.

20. A method for characterising a cable or transmission line, the method comprising:

obtaining a first echo response using time domain reflectometry;

coupling a first end of the cable or transmission line to a time domain reflectometer;

obtaining a second echo response using time domain reflectometry; and selecting a predetermined set of samples within the second echo response and a corresponding predetermined set of samples within the first echo response for comparison;

determining a characteristic of the cable or transmission line by comparing the predetermined set of samples within the first echo response and the predetermined set of samples within the second echo response.

21. The method according to claim 20, further comprising:
determining a presence of a first reflection and a second reflection in the second echo response; and
selecting the predetermined set of samples such that they include the second reflection and do not include the first reflection.

22. The method according to claim 21, further comprising:
determining an amplitude of a first sample within the predetermined set of samples within the second echo response;
determining the amplitude of a final sample within the predetermined set of samples within the second echo response;
determining a difference between the amplitude of the first sample and the amplitude of the final sample; and
fitting a polynomial function to at least one of a start and an end of the predetermined set of samples within the second echo response so that the first sample and the final sample have the same amplitude.

23. A method for characterising a cable or transmission line, the method comprising:
obtaining a first echo response using time domain reflectometry;
coupling a first end of the cable or transmission line to a time domain reflectometer;
obtaining a second echo response using time domain reflectometry; and
determining a characteristic of the cable or transmission line by comparing the first echo response and the second echo response;
comparing the determined characteristic of the cable or transmission line to a cable standard or communications standard comprising cable definitions; and
determining whether the cable or transmission line is compliant with the cable standard or communications standard.

24. The method according to claim 23, wherein determining the characteristic of the cable or transmission line includes determining an insertion loss of the cable or transmission line as the determined characteristic of the cable or transmission line.

25. The method according to claim 24, comprising extrapolating the insertion loss by a factor as the determined characteristic of the cable or transmission line.

26. The method according to claim 24, comprising determining a maximum cable length still compliant with the cable standard or communication standard based on the determined characteristic of the cable or transmission line.

27. A method for characterising a cable or transmission line, the method comprising:
obtaining a first echo response using time domain reflectometry;
coupling a first end of the cable or transmission line to a time domain reflectometer;
obtaining a second echo response using time domain reflectometry; and
determining a characteristic of the cable or transmission line by comparing the first echo response and the second echo response;
determining a second characteristic of the cable or transmission line; and
determining degradation of the cable characteristics by comparing the second characteristic of the cable or transmission line to the characteristic of the cable or transmission line.

28. A method for characterising a cable or transmission line, the method comprising:
obtaining a first echo response using time domain reflectometry from a first end of a cable or transmission line using a first time domain reflectometer whilst a second end of the cable is coupled to a second time domain reflectometer;
obtaining a second echo response using time domain reflectometry from the second end of the cable or transmission line whilst the first end of the cable or transmission line is coupled to the first time domain reflectometer;
identifying a first complete reflection in the first echo response, the first reflection corresponding to an impedance mismatch between the first time domain reflectometer and the cable or transmission line;
identifying a second complete reflection in the second echo response, the second complete reflection corresponding to an impedance mismatch between the cable or transmission line and the first time domain reflectometer coupled at the first end of the cable;
determining a ratio of a fast Fourier transform of the first complete reflection within the first echo response to a fast Fourier transform of the second complete reflection within the second echo response; and
taking a logarithm of the ratio and multiplying by ½ to determine an insertion loss of the cable in decibels.

29. The method according to claim 28, further comprising:
identifying a third complete reflection in the first echo response, the third complete reflection corresponding to an impedance mismatch between the cable or transmission line and the second reflectometer coupled at the second end of the cable or transmission line;
determining a ratio of a fast Fourier transform of the first complete reflection within the first echo response to a fast Fourier transform of the third complete reflection within the first echo response; and
taking a logarithm of the ratio and multiplying by ½ to determine the insertion loss of the cable in decibels.

30. A method for characterising a cable or transmission line, the method comprising:
obtaining a first echo response of a time domain reflectometer using time domain reflectometry;
coupling a first end of the cable or transmission line to a time domain reflectometer;
obtaining a second echo response of the cable or transmission line using time domain reflectometry; and
determining a return loss of the cable or transmission line by comparing the first echo response and the second echo response.

31. The method according to claim 2, wherein obtaining the first echo response comprises obtaining the first echo response whilst a first output terminal and second output terminal of the time domain reflectometer are open-circuited.

32. The method according to claim 2, wherein obtaining the first echo response comprises obtaining the first echo response whilst a first output terminal and second output terminal of the time domain reflectometer are short-circuited.

* * * * *